US012568103B2

(12) United States Patent
Lowe et al.

(10) Patent No.: US 12,568,103 B2
(45) Date of Patent: Mar. 3, 2026

(54) SYSTEMS AND METHODS FOR QUERYING INCIDENT INVESTIGATIONS

(71) Applicant: ATLASSIAN PTY LTD, Sydney (AU)

(72) Inventors: Gemma Lowe, Coffs Harbour (AU); Gregory Kowalczyk, Amsterdam (NL); Ramazan Uysal, Amsterdam (NL)

(73) Assignee: ATLASSIAN PTY, LTD., Sydney (AU)

( * ) Notice: Subject to any disclaimer, the term of this patent is extended or adjusted under 35 U.S.C. 154(b) by 0 days.

(21) Appl. No.: 18/754,659

(22) Filed: Jun. 26, 2024

(65) Prior Publication Data

US 2026/0006046 A1      Jan. 1, 2026

(51) Int. Cl.
  *G06F 16/2457*       (2019.01)
  *H04L 9/40*       (2022.01)

(52) U.S. Cl.
  CPC .... *H04L 63/1425* (2013.01); *G06F 16/24575* (2019.01)

(58) Field of Classification Search
  CPC ...................... H04L 63/1425; G06F 16/24575
  See application file for complete search history.

(56) References Cited

U.S. PATENT DOCUMENTS

| | | | | |
|---|---|---|---|---|
| 8,032,507 B1 * | 10/2011 | Bayardo | ............. | G06F 16/3347 707/706 |
| 8,225,407 B1 * | 7/2012 | Thrower | ............. | H04L 63/1441 726/25 |

| | | | | |
|---|---|---|---|---|
| 9,027,121 B2 * | 5/2015 | Hammer | ............... | G06F 21/554 709/224 |
| 10,530,805 B1 * | 1/2020 | Tamersoy | .......... | H04L 63/1408 |
| 10,542,017 B1 * | 1/2020 | Gates | ................. | H04L 63/1433 |
| 10,721,266 B1 * | 7/2020 | Herman-Saffar | ... | H04L 63/1441 |
| 11,075,951 B1 * | 7/2021 | Kats | ........................ | H04L 63/20 |
| 2014/0172843 A1 * | 6/2014 | Upstill | ............... | G06F 16/9537 707/E17.014 |
| 2017/0289178 A1 * | 10/2017 | Roundy | .............. | H04L 63/1425 |
| 2020/0220885 A1 * | 7/2020 | Will | ..................... | H04L 63/145 |
| 2020/0314141 A1 * | 10/2020 | Vajipayajula | ......... | H04L 63/145 |
| 2021/0200826 A1 * | 7/2021 | Schuler | .................. | G06F 16/43 |
| 2022/0414571 A1 * | 12/2022 | Buggins | ........... | G06Q 10/06316 |

* cited by examiner

*Primary Examiner* — Jorge A Casanova

(74) *Attorney, Agent, or Firm* — ALSTON & BIRD LLP

(57)       ABSTRACT

Systems and methods provide techniques for improving incident investigation efficiency. In various embodiments, a method includes obtaining historical query inputs associated with historical incident investigations; generating an incident investigation dataset based on the historical query inputs and respective metadata associated with the historical incident investigations; receiving, from a computing device via an application programming interface (API), a query search string; generating a response based on the query search string and the incident investigation dataset, the request response comprising a historical query input and a digital reference to the metadata for a respective historical incident investigation associated with the historical query input, wherein metadata or historical query input are within a threshold similarity to the query search string; and provisioning the response to the computing device via the API, wherein the request response causes the computing device to render a graphical user interface comprising the historical query input and digital reference.

20 Claims, 9 Drawing Sheets

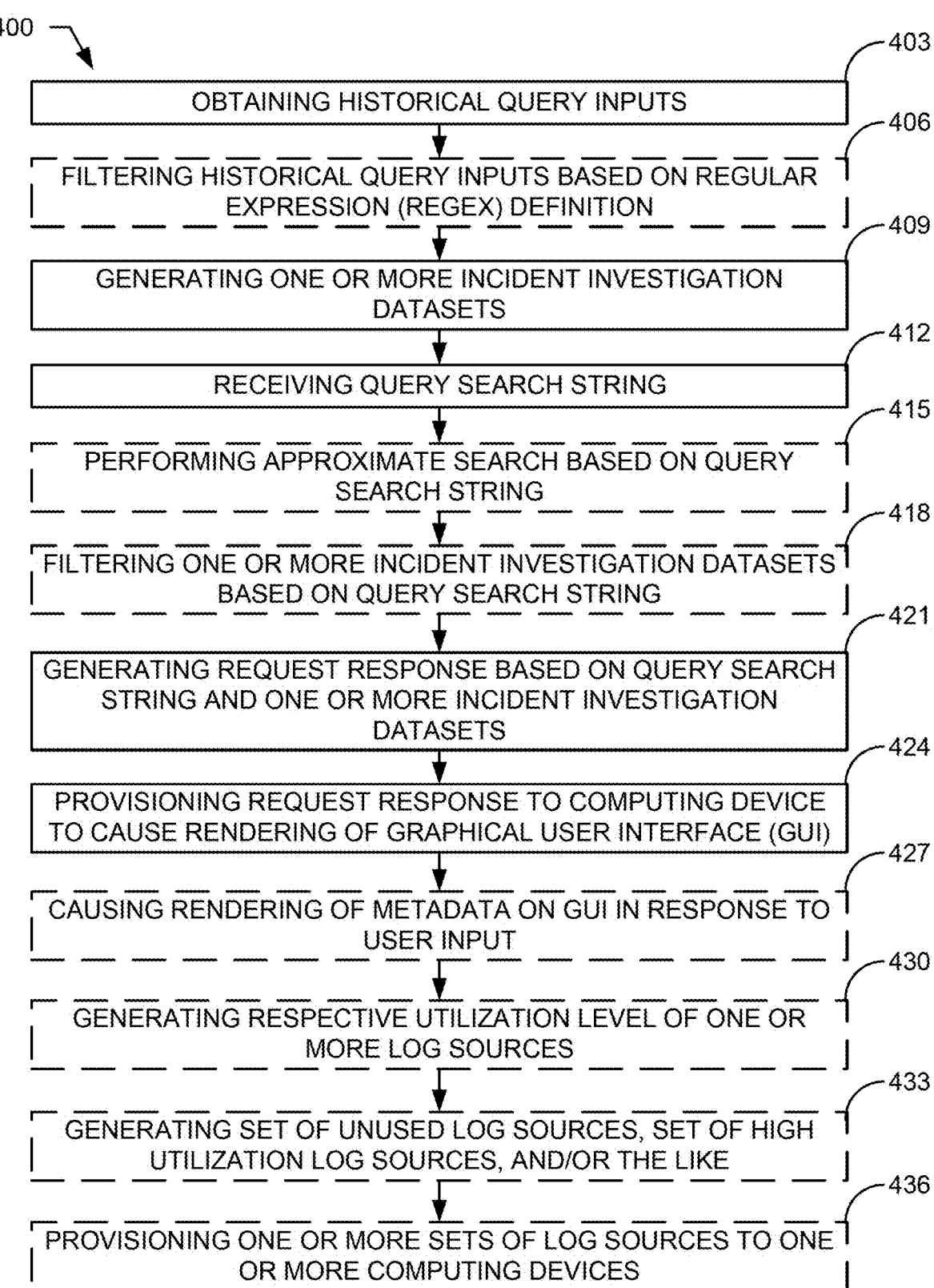

400

403 OBTAINING HISTORICAL QUERY INPUTS

406 FILTERING HISTORICAL QUERY INPUTS BASED ON REGULAR EXPRESSION (REGEX) DEFINITION

409 GENERATING ONE OR MORE INCIDENT INVESTIGATION DATASETS

412 RECEIVING QUERY SEARCH STRING

415 PERFORMING APPROXIMATE SEARCH BASED ON QUERY SEARCH STRING

418 FILTERING ONE OR MORE INCIDENT INVESTIGATION DATASETS BASED ON QUERY SEARCH STRING

421 GENERATING REQUEST RESPONSE BASED ON QUERY SEARCH STRING AND ONE OR MORE INCIDENT INVESTIGATION DATASETS

424 PROVISIONING REQUEST RESPONSE TO COMPUTING DEVICE TO CAUSE RENDERING OF GRAPHICAL USER INTERFACE (GUI)

427 CAUSING RENDERING OF METADATA ON GUI IN RESPONSE TO USER INPUT

430 GENERATING RESPECTIVE UTILIZATION LEVEL OF ONE OR MORE LOG SOURCES

433 GENERATING SET OF UNUSED LOG SOURCES, SET OF HIGH UTILIZATION LOG SOURCES, AND/OR THE LIKE

436 PROVISIONING ONE OR MORE SETS OF LOG SOURCES TO ONE OR MORE COMPUTING DEVICES

Figure 6B:
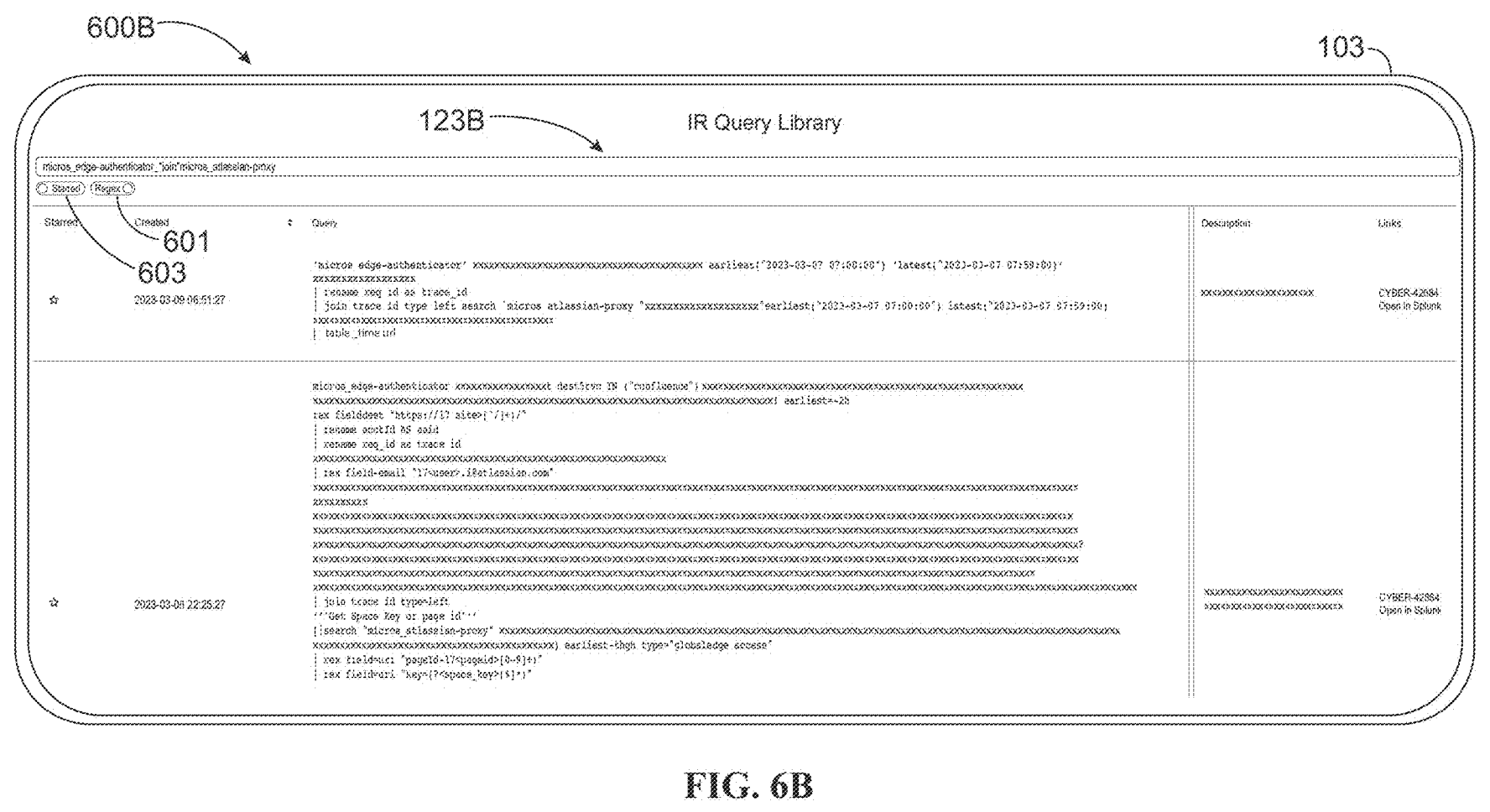

Figure 7:
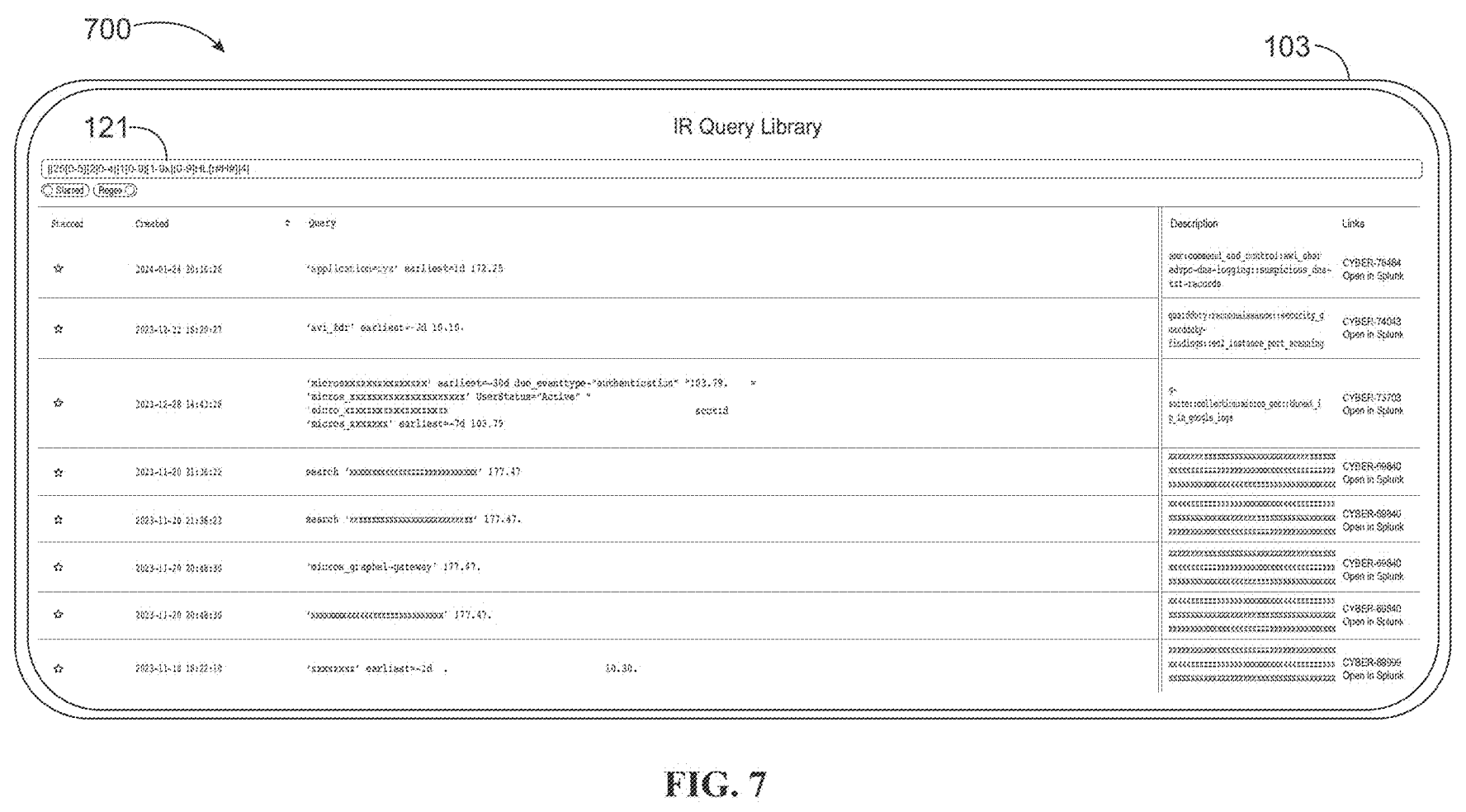

SYSTEMS AND METHODS FOR QUERYING INCIDENT INVESTIGATIONS

BACKGROUND

Various methods, apparatuses, and systems are configured to provide techniques for accumulating and querying data related to investigations of cyber incidents. Applicant has identified many deficiencies and problems associated with existing methods, apparatuses, and systems for identifying and accessing useful queries and other data for investigating activities occurring in one or more user-accessed applications. Through applied effort, ingenuity, and innovation, these identified deficiencies and problems have been solved by developing solutions that are in accordance with the embodiments of the present disclosure, many examples of which are described in detail herein.

BRIEF SUMMARY

In general, embodiments of the present disclosure provide methods, apparatuses, systems, computing devices, and/or the like that are configured to extract and provision historical query inputs and metadata that may be utilized to enhance investigations of cyber incidents. For example, certain embodiments of the present disclosure provide methods, apparatuses, systems, computing devices, and/or the like that accumulate executable scripts previously utilized in incident investigations to analyze data associated with anomalous activities occurring on computing devices, networks, applications, and/or the like. Further, the methods, apparatuses, systems, computing devices, and/or the like are configured to process user inputs to selectively index and serve subsets of historical query inputs and metadata that demonstrate relevance to presently occurring incident investigations. By doing so, the methods, apparatuses, systems, computing devices, and/or the like enable investigators of cyber incidents to quickly access useful investigation tools and information from a broad knowledge base of historical incident investigation techniques. In this manner, the methods, apparatuses, systems, computing devices, and/or the like enhance investigation efficiency, throughput, and scalability.

In accordance with one aspect, a method is provided. In one embodiment, the method comprises: obtaining a plurality of historical query inputs, wherein subsets of the historical query inputs are associated with respective historical incident investigations; generating an incident investigation dataset based at least in part on the historical query inputs and respective metadata associated with the historical incident investigations; receiving, from a computing device via an application programming interface (API), a query search string; generating a request response based at least in part on the query search string and the incident investigation dataset, wherein the request response comprises: at least one historical query input; and a digital reference to the metadata for a respective historical incident investigation associated with the at least one historical query input, wherein at least one of the metadata or the at least one historical query input are within a threshold similarity to the query search string; and provisioning the request response to the computing device via the API, wherein the request response causes the computing device to render a graphical user interface (GUI) comprising the at least one historical query input and the digital reference to the metadata.

In some embodiments, the metadata comprises an incident identifier. In some embodiments, the metadata comprises an incident summary. In some embodiments, the metadata comprises a timestamp associated with initiation of the respective historical incident investigation. In some embodiments, the metadata comprises at least one user identifier associated with the at least one historical query input. In some embodiments, the method further comprises filtering the plurality of historical query inputs based at least in part on a regular expression (regex) definition. In some embodiments, the method further comprises receiving, via a second API, at least one incident investigation summary; and extracting at least a subset of the plurality of historical query inputs from the at least one incident investigation summary, wherein the incident investigation summary is obtained from a remote computing environment via a second API. In some embodiments, extracting a respective historical query input from the at least one incident investigation summary comprises: verifying that the historical query input contains at least one unformatted substring component; and verifying that at least a portion of the at least one unformatted substring matches a naming convention of a log source associated with the at least one incident investigation.

In some embodiments, the method further comprises obtaining at least one additional query input via an asynchronous task service; and updating the incident investigation dataset based at least in part on the at least one additional query input. In some embodiments, the method further comprises generating a respective utilization level for a plurality of log sources based at least in part on the incident investigation dataset; generating, based on the respective utilization levels, at least one of i) a set of unused log sources, or ii) a set of high utilization log sources; and provisioning to a second computing device at least one of the set of unused log sources or the set of high utilization log sources. In some embodiments, the method further comprises, in response to the computing device receiving an input selecting a respective digital reference, causing rendering of the metadata associated with one of the plurality of historical incident investigations on the GUI.

In some embodiments, the query search string comprises at least one regex operator; and generating the request response comprises filtering respective entries of the incident investigation dataset based at least in part on the at least one regex operator. In some embodiments, the query search string comprises at least one metadata type. In some embodiments, the query search string comprises at least one at least one incident identifier associated with a respective historical incident investigation. In some embodiments, the method further comprises configuring the threshold similarity based at least in part on a request from the computing device, wherein the request indicates a precise search mode or an approximate search mode.

In some embodiments, the method further comprises obtaining investigation data representative of a current incident investigation; and generating the request response based at least in part on respective comparisons between the investigation data and the incident investigation dataset. In some embodiments, the method further comprises receiving from the computing device via the API a command to generate the request response in a precise search mode; and in response to the command, verifying that at least a subset of the at least one historical query input exactly matches at least a portion of the query search string. In some embodiments, the digital reference comprises a hyperlink to a remote computing environment comprising the metadata for the respective historical incident associated with the at least one historical query input.

In accordance with another aspect, a computer program product is provided. The computer program product in some embodiments includes at least one non-transitory computer-readable storage medium having computer program code stored thereon. The computer program code in execution with at least one processor is configured for performing any one of the example computer-implemented methods described herein. In some embodiments, the at least one non-transitory computer-readable storage medium having computer program code comprising executable portions configured to: obtain a plurality of historical query inputs, wherein subsets of the historical query inputs are associated with respective historical incident investigations; generate an incident investigation dataset based at least in part on the historical query inputs and respective metadata associated with the historical incident investigations; receive, from a computing device via an application programming interface (API), a query search string; generate a request response based at least in part on the query search string and the incident investigation dataset, wherein the request response comprises: at least one historical query input; and a digital reference to the metadata for a respective historical incident investigation associated with the at least one historical query input, wherein at least one of the metadata or the at least one historical query input are within a threshold similarity to the query search string; and provision the request response to the computing device via the API, wherein the request response causes the computing device to render a graphical user interface (GUI) comprising the at least one historical query input and the digital reference to the metadata.

In accordance with another aspect, an apparatus comprising at least one processor and at least one memory including computer program code is provided. The computer program code in execution with the at least one processor causes the apparatus to perform any one of the example computer-implemented methods described herein. In one embodiment, the at least one memory and the computer program code may be configured to, with the processor, cause the apparatus to: obtain a plurality of historical query inputs, wherein subsets of the historical query inputs are associated with respective historical incident investigations; generate an incident investigation dataset based at least in part on the historical query inputs and respective metadata associated with the historical incident investigations; receive, from a computing device via an application programming interface (API), a query search string; generate a request response based at least in part on the query search string and the incident investigation dataset, wherein the request response comprises: at least one historical query input; and a digital reference to the metadata for a respective historical incident investigation associated with the at least one historical query input, wherein at least one of the metadata or the at least one historical query input are within a threshold similarity to the query search string; and provision the request response to the computing device via the API, wherein the request response causes the computing device to render a graphical user interface (GUI) comprising the at least one historical query input and the digital reference to the metadata.

In accordance with yet another aspect, the apparatus includes means for performing each step of any of the computer-implemented methods described herein. In one embodiment, the apparatus includes means for: obtaining a plurality of historical query inputs, wherein subsets of the historical query inputs are associated with respective historical incident investigations; generating an incident investigation dataset based at least in part on the historical query inputs and respective metadata associated with the historical incident investigations; receiving, from a computing device via an application programming interface (API), a query search string; generating a request response based at least in part on the query search string and the incident investigation dataset, wherein the request response comprises: at least one historical query input; and a digital reference to the metadata for a respective historical incident investigation associated with the at least one historical query input, wherein at least one of the metadata or the at least one historical query input are within a threshold similarity to the query search string; and provisioning the request response to the computing device via the API, wherein the request response causes the computing device to render a graphical user interface (GUI) comprising the at least one historical query input and the digital reference to the metadata.

BRIEF DESCRIPTION OF THE SEVERAL VIEWS OF THE DRAWINGS

Figure 1:
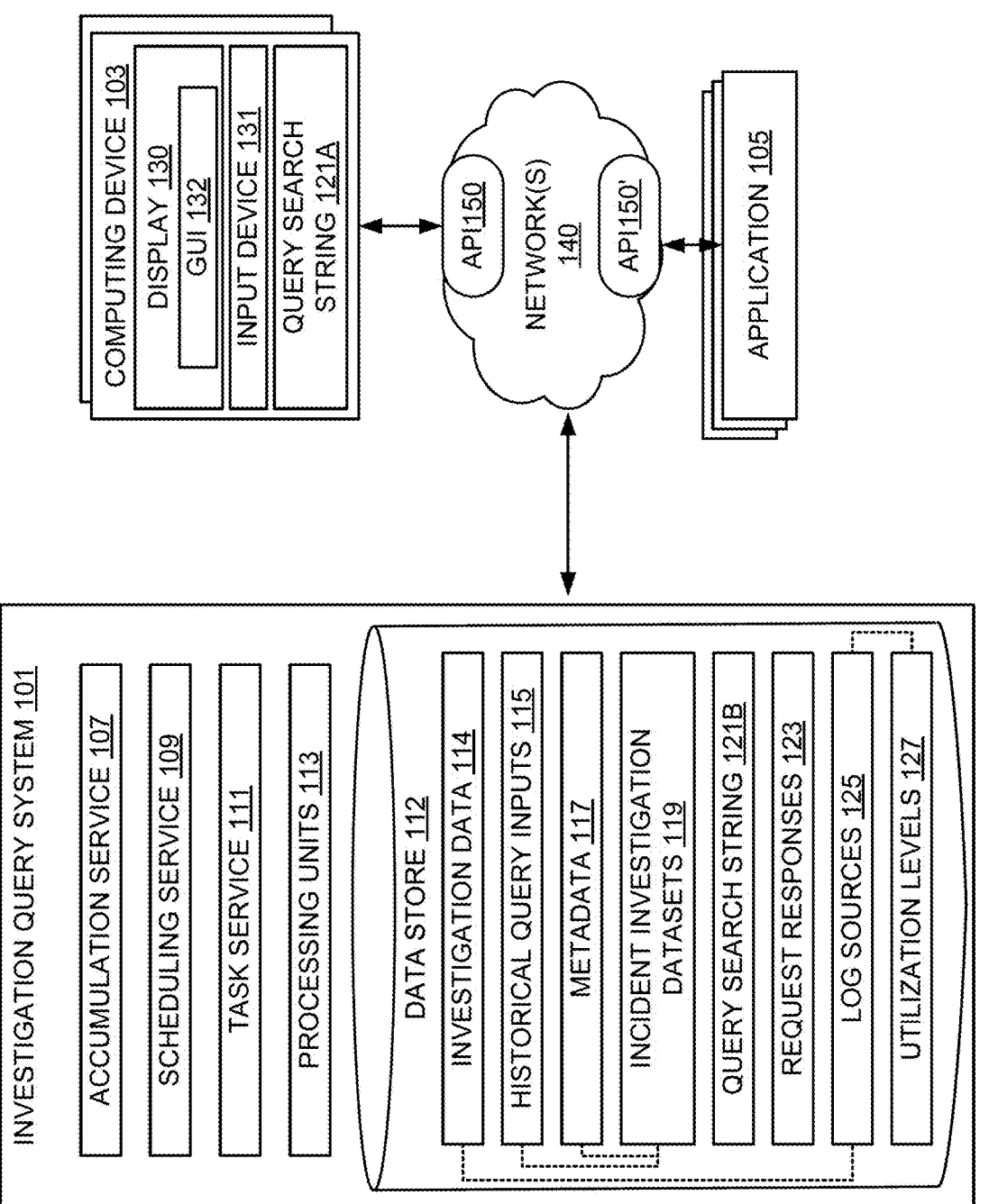

Having thus described some embodiments in general terms, references will now be made to the accompanying drawings, which are not drawn to scale, and wherein:

FIG. 1 is a block diagram of an example network environment in which a specially configured investigation query system may operate in accordance with one or more embodiments of the present disclosure.

Figure 2:
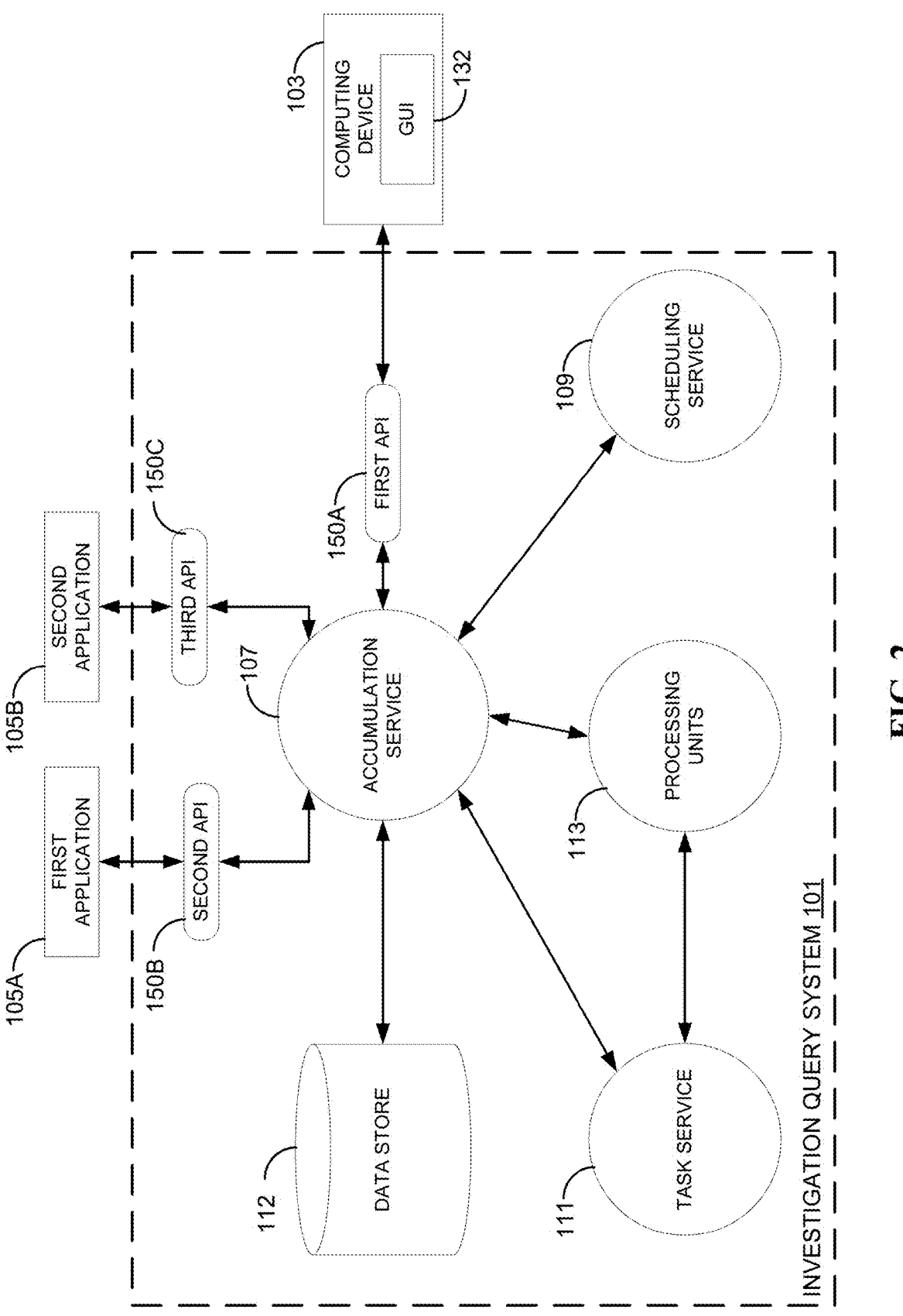

FIG. 2 shows an example investigation query system in accordance with at least some embodiments of the present disclosure.

Figure 3:
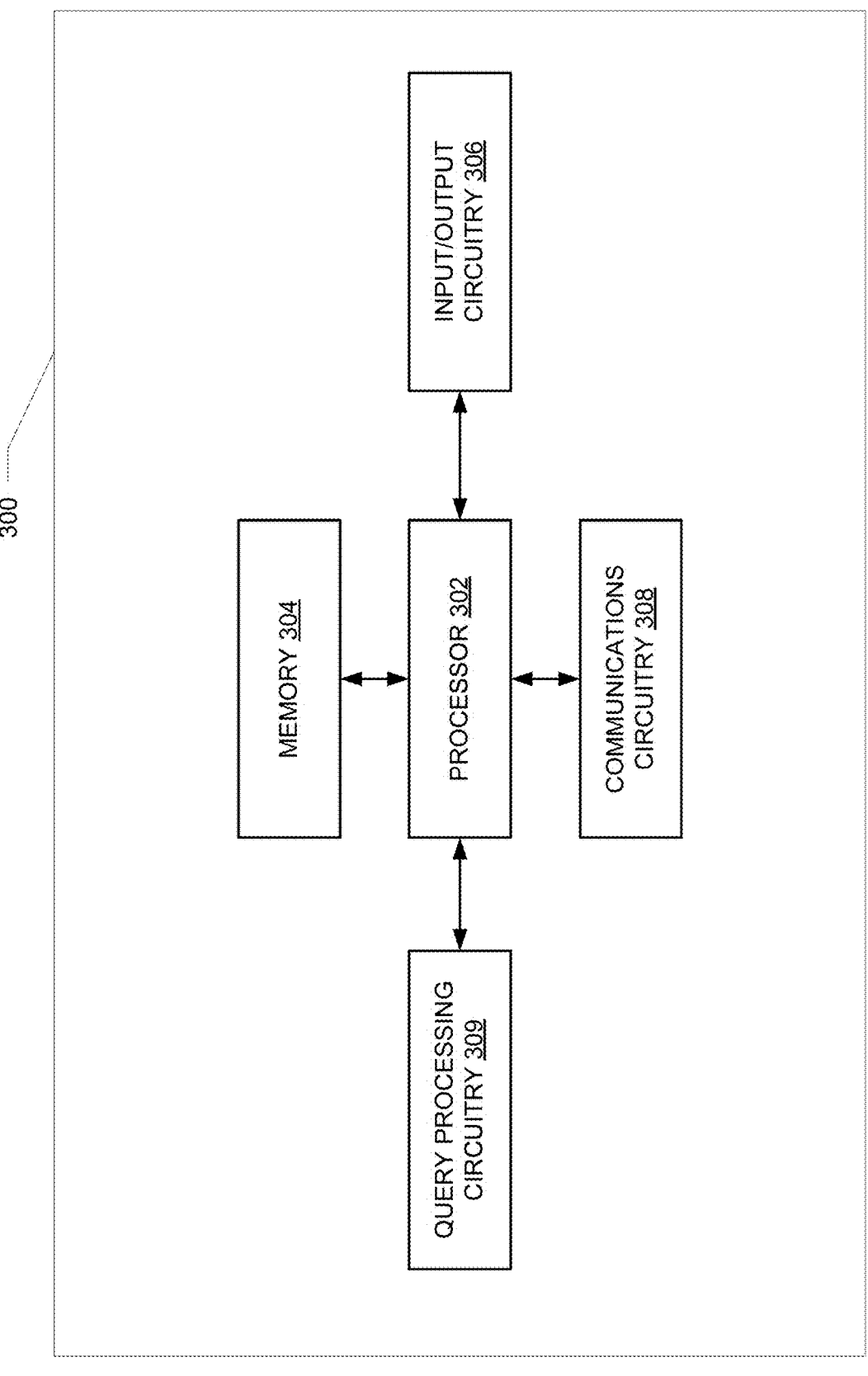

FIG. 3 is a block diagram of an example apparatus that may embody the specially configured investigation query system in accordance with one or more embodiments of the present disclosure.

FIG. 4 provides a flowchart diagram of an example process for querying incident investigations in accordance with at least some embodiments of the present disclosure.

Figure 5:
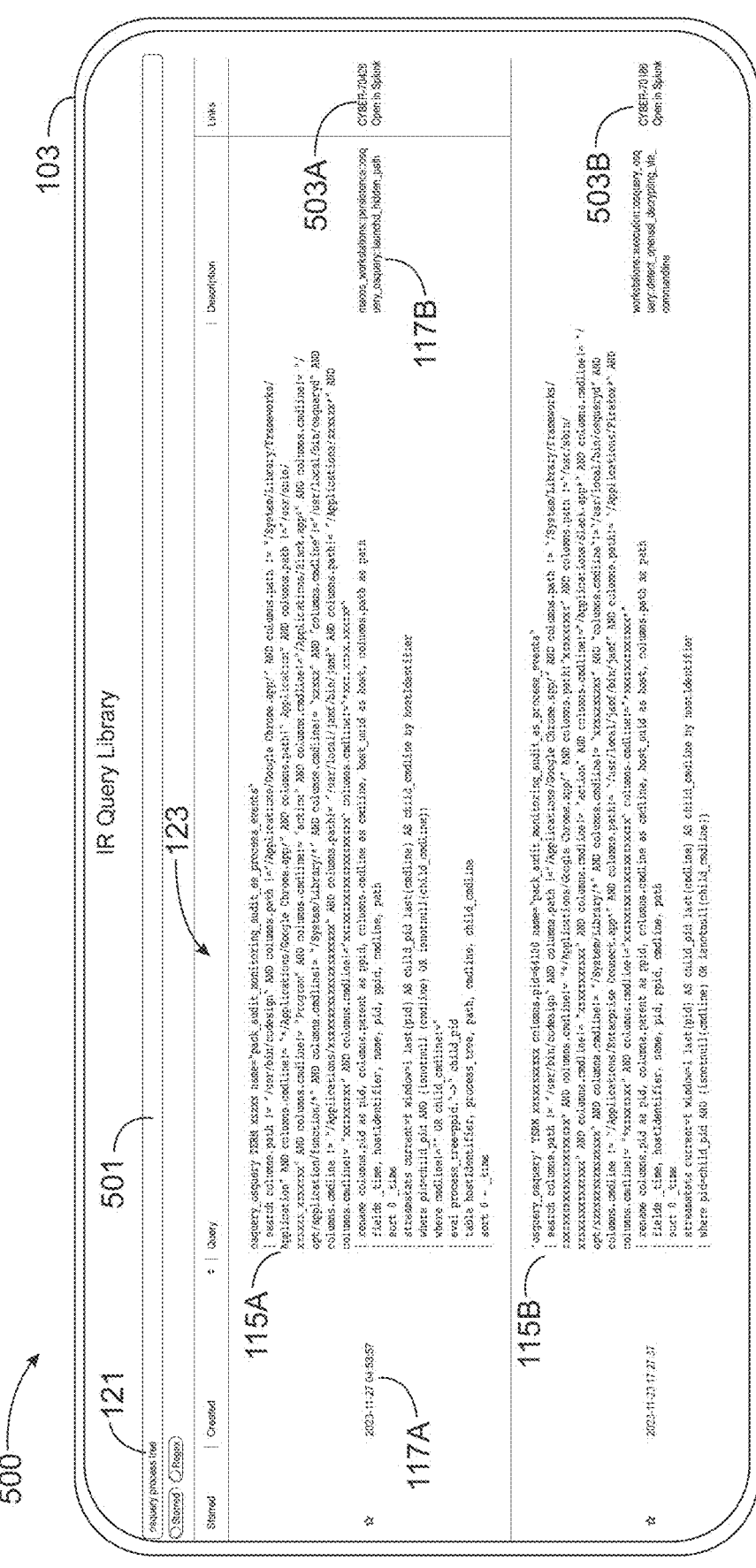

FIG. 5 shows a computing device including an example query interface in accordance with at least some embodiments of the present disclosure.

Figure 6A:
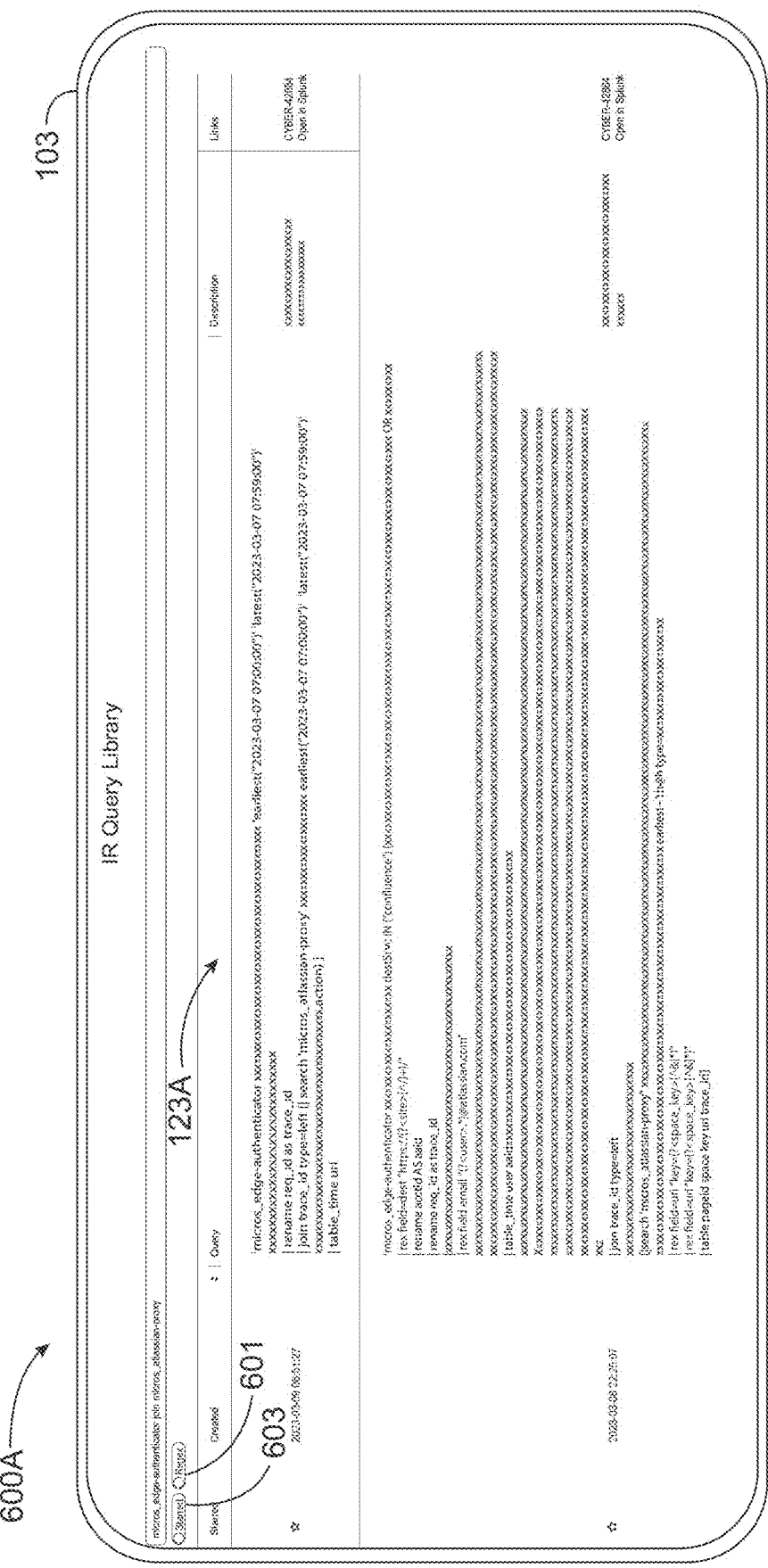

FIG. 6A shows a computing device including an example query interface in accordance with at least some embodiments of the present disclosure.

FIG. 6B shows a computing device including an example query interface in accordance with at least some embodiments of the present disclosure.

FIG. 7 shows a computing device including an example query interface in accordance with at least some embodiments of the present disclosure.

Figure 8:
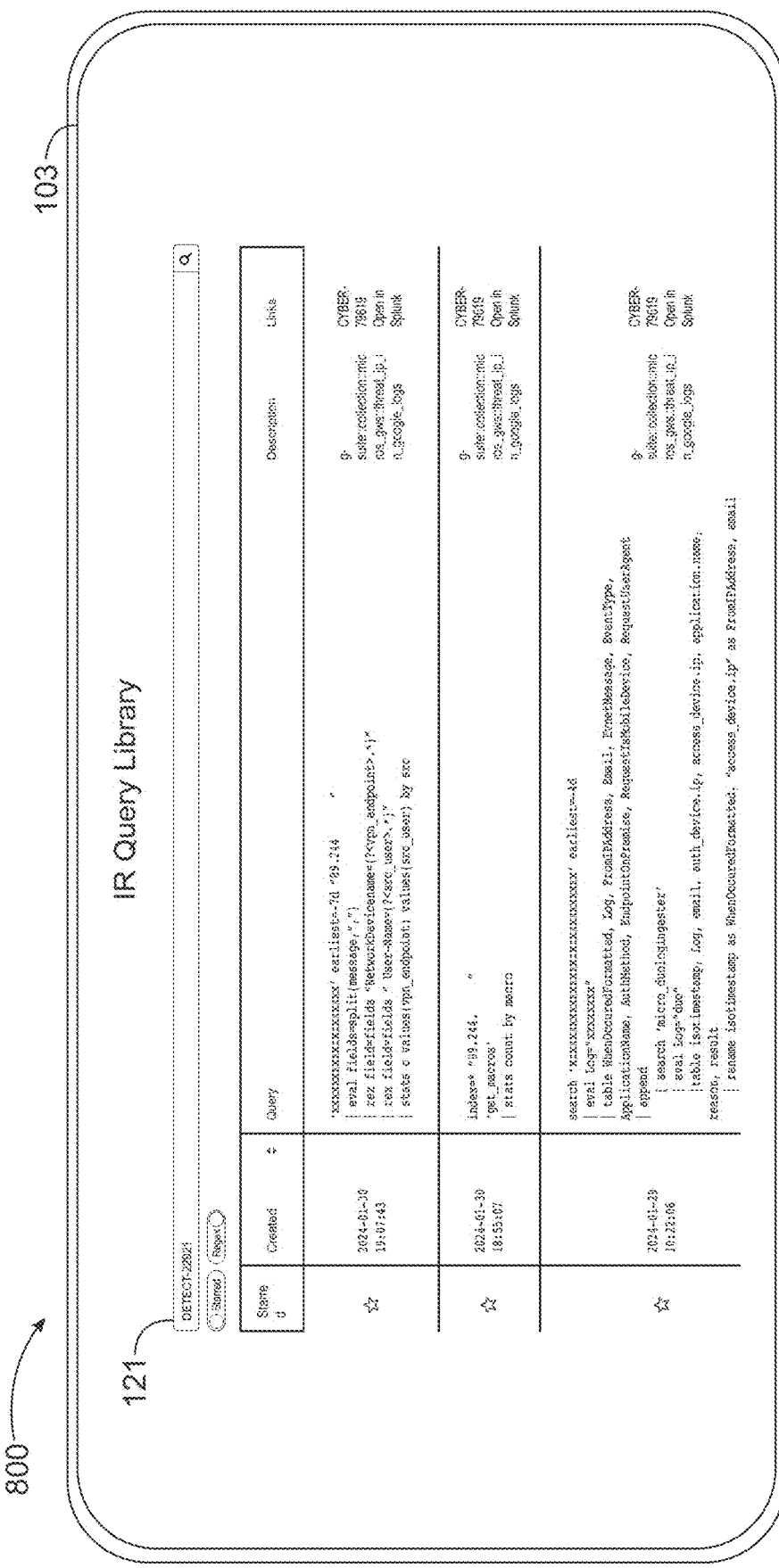

FIG. 8 shows a computing device including an example query interface in accordance with at least some embodiments of the present disclosure.

DETAILED DESCRIPTION OF VARIOUS EMBODIMENTS

Various embodiments of the present disclosure now will be described more fully hereinafter with reference to the accompanying drawings, in which some, but not all embodiments of the disclosure are shown. Indeed, the disclosure may be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. The terms "illustrative,"

"example," and "exemplary" are used to be examples with no indication of quality level. Like numbers refer to like elements throughout.

Overview

Investigators of anomalous cyber activity may be tasked with probing thousands of incidents in a limited time span. For example, thousands of incidents may be detected within a given month, with each incident requiring expert review and triage. Existing approaches to review and triage of such alerts rely upon manual review, the basis of which may be built upon actions performed in prior investigations. However, such approaches may be limited to the tools and procedures that are manually identified or individually retrievable by a single investigator. For example, an alert may appear in a queue and be assigned to an investigator for evaluation. In existing approaches, the investigator manually reviews alerts of prior incident investigations to identify past performed techniques, such as a particular query (e.g., executable program code) that may be used to search and index relevant information from one or more data stores. As a result, the investigator may spend excess time and resources identifying useful techniques for evaluating and triaging anomalous cyber activities, thereby reducing efficiency and throughput of incident investigations. In another example, an investigator may manually store their own past performed queries in a digital file or paper medium, which still requires physical reevaluation by the investigator for each incident while also limiting the scope of retrievable techniques to those that are developed by the individual investigator.

To address the above-described challenges related to identifying and accessing useful tools for investigating incidents, various embodiments of the present disclosure described techniques for extracting and surfacing historical incident investigation queries and related information to investigators. For example, the technique may include generating incident investigation datasets at least in part by obtaining and storing query inputs and relevant metadata of prior incident investigations. The technique may further include utilizing the one or more incident investigation datasets to determine and report one or more historical query inputs, incident investigation metadata, and/or the like that are within a threshold similarity to a user-inputted search string. In doing so, the technique may enable serving of relevant tools and information for evaluating and triaging detected incidents in one or more applications, networks, computing devices, and/or the like.

By utilizing the noted techniques for scraping, indexing, and provisioning relevant queries and metadata to a user, various embodiments of the present disclosure improve the discoverability of useful tools and techniques for evaluating anomalous cyber activities. In doing so, the noted embodiments of the present disclosure can increase efficacy and accuracy of investigating and triaging incidents occurring in applications, computing devices, networks, and/or the like. By identifying and surfacing the most relevant prior queries and metadata for investigating an incident, the described embodiments of the present disclosure enhance system administration efficiency and security.

Definitions

As used herein, the terms "data," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The terms "computer-readable storage medium" refers to a non-transitory, physical or tangible storage medium (e.g., volatile or non-volatile memory), which may be differentiated from a "computer-readable transmission medium," which refers to an electromagnetic signal.

As used herein, the term "computing device" refers to computer hardware and/or software that is configured to facilitate investigation of anomalous activities. Computing devices may include, without limitation, smart phones, tablet computers, laptop computers, wearables, personal computers, enterprise computers, and the like.

A used herein, the term "incident" refers to any anomalous or irregular activity on one or more applications, networks, computing devices, and/or the like.

As used herein, the term "incident investigation" refers to any review, analysis, or assessment of anomalous activity occurring in one or more computing environments. An incident investigation may include identifying and reviewing data associated with anomalous activity or one or more computing devices, applications, networks, and/or the like that are related to the anomalous activity. An incident investigation may include triaging the anomalous activity, which may refer to determining a priority or timeliness of responding to the anomalous activity. In various embodiments, an incident investigation is performed at least in part by executing queries to search or index data associated with an incident. For example, an investigator may initiate a search based on a query input to identify and review data associated with a detection or alert of anomalous activity.

As used herein, the term "query input" refers to any executable script, code, or set of instructions for searching or indexing a data structure. The term "historical query input" refers to any prior inputted keyword, script, code, or set of instructions for searching or indexing a data structure. For example, a query may comprise a set of computer program code for retrieving, parsing, and returning a subset of investigation data that matches a target format, composition, and/or the like.

As used herein, the term "investigation data" refers to any data related to anomalous activity or a computing device, application, network, and/or the like with which anomalous activity is associated. For example, investigation data may include one or more query inputs. In some embodiments, investigation data includes metadata associated with a historical incident, historical incident investigation, historical query input, and/or the like. For example, investigation data may include alerts, detections, device identifiers, and/or the like. As another example, investigation data may include records of actions requested to or performed by one or more computing devices, applications, and/or the like. In another example, investigation data may include descriptions of or commentaries on incidents, incident investigations, and/or the like. In some embodiments, investigation data associated with an application, computing device, network, or investigator is stored in a log source, which may serve as a specific repository for investigation data associated with the application, computing device, network, or investigator.

As used herein, the term "metadata" refers to any data associated with a query input, incident, incident investigation, investigator, and/or the like. For example, metadata associated with a query input may include a query creation timestamp, query description, query author, and/or the like. As another example, metadata associated with an incident or incident investigation may include an incident identifier, incident summary, or one or more labels indicative of alerts or detections with which the incident is associated. In still another example, metadata may include identifiers for one or more log sources utilized in performance of an investigation.

As used herein, the term "investigator" refers to any computing entity, user entity, and/or the like that performs an incident investigation. For example, an investigator may include a human subject that uses the disclosed system, method, apparatus, computer program product, and/or the like. As another example, an investigator may include an automated computing entity that embodies the disclosed system, method, apparatus, computer program product, and/or the like.

As used herein, "application" refers to any program code executable by logic circuitry of one or more computing devices, such as a server processor. In some embodiments, an application is a computer program accessible to an entity via a computing device and which performs a specific function directly or indirectly for the entity, the computing device, another application, and/or the like. In some embodiments, an application includes a local software program installed and executed on a computing device accessible to an entity. In some embodiments, an application includes a remotely executed software program accessible to the entity via the entity's computing device and a suitable network connection to the corresponding remote computing environment.

Non-limiting examples of applications include local computer programs, remote computer programs, services, microservices, software modules, communication interfaces, and/or the like. In one example, an application may be a ticketing and project management service, such as Jira™. In another example, an application may be a cloud-based computing environment that enables collaborative workflows, such as Confluence™. In another example, an application may be a remote computing environment that provides program repository services, such as Bitbucket™. In still another example, an application may be an electronic mail (e-mail) and scheduling management platform. Other examples of applications include project visualization tools, incident management tools, user administration and authentication programs, collaborative work platforms, risk management and monitoring services, software testing tools, and/or the like. In some embodiments, application may refer to specific functions, features, services, and/or the like that are accessible using executable program code, or portion thereof. For example, application may refer to a specific functionality or action that may be performed using an application.

Methods, apparatuses, and computer program products of the present disclosure may be embodied by any of a variety of devices. For example, the method, apparatus, and computer program product of an example embodiment may be embodied by a networked device (e.g., an enterprise platform), such as a server or other network entity, configured to communicate with one or more devices, such as one or more query-initiating computing devices. Additionally, or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

Example System Architecture

FIG. 1 illustrates an example network environment 100 in which a specially-configured investigation query system may operate in accordance with one or more embodiments of the present disclosure. In some embodiments, the network environment 100 includes an investigation query system 101 configured to communicate with other elements of the network environment 100 via one or more networks 140. In some embodiments, other elements of the network environment 100 include one or more computing devices 103 and one or more applications 106. In some embodiments, the investigation query system 101 is configured to obtain investigation data 114, historical query inputs 115, metadata 117, and/or the like based on a real-time or near real-time monitoring of activities occurring within one or more computing devices 103, applications 105, networks 140, and/or the like. In various embodiments, the investigation query system 101 is configured to perform one or more processes for determining and reporting relevant historical query inputs 115 and metadata 117 to an investigator based at least in part on a query search string 121A, 121B received from the investigator's computing device 103. For example, the investigation query system 101 may perform a process 400 for querying incident investigations as shown in FIG. 4 and described herein.

The computing device 103 includes one or more computing device(s) accessible to an incident investigator and configured to present information related to real-time and historical monitoring of activities occurring on one or more applications 104, networks 140, and other computing devices, such as those associated with users of the one or more applications 104. In some embodiments, a computing device 103 is representative of user devices that interact with applications 105 to perform tasks and access application services. In some embodiments, the computing device 103 includes a personal computer, laptop, smartphone, tablet, Internet-of-Things enabled device, smart home device, virtual assistant, alarm system, workstation, work portal, and/or the like. The computing device 103 may include one or more displays 130, one or more visual indicator(s), one or more audio indicator(s) and/or the like that enables output of information to the particular entity. For example, the investigation query system 101 may cause provision of a graphical user interface (GUI) 132 to the computing device 103, and the computing device 103 may render the GUI 132 on the display 130. In some embodiments, the computing device 103 includes one or more input devices 131 for receiving user inputs, such as query search strings 121A, selections of digital references to metadata 117, and/or the like. In some embodiments, the input device 131 includes one or more buttons, cursor devices, touch screens, including three-dimensional-or pressure-based touch screens, camera, fingerprint scanners, accelerometer, retinal scanner, gyroscope, magnetometer, and/or other input devices.

The application 105 is a computer program accessible to an entity (e.g., a human user or another computing entity) via a computing device and which performs a specific function directly or indirectly for the entity, the computing device, another application, and/or the like. In some embodiments, services, interactions, events, statuses, or other activities occurring within or in association with the application 105 are recorded within one or more data stores such that the data may be accessible to the investigation query system 101 via one or more application programming interfaces (APIs) 150'. In some embodiments, the data representative of activities occurring on or in association with an application 105 is stored in and retrievable from one or more log sources 125. In various embodiments, the investigation query system 101 is configured to enhance efficiency and specificity of investigations into incidents determined to have occurred on or in association with an application 105.

In various embodiments, the investigation query system 101 generates a library of historical query inputs 115 and metadata 117 associated with historical incident investigations such that the historical query inputs 115 and metadata 117 may be retrieved, reapplied, and iterated upon in current and future incident investigations. For example, the investigation query system 101 may extract query inputs from incident investigations conducted via one or more applications 105, such as Splunk or Databricks. In some embodiments, the investigation query system 101 generates incident investigation datasets 119 comprising historical query inputs 115, metadata 117, and/or the like that are associated with one or more historical incident investigations.

In some embodiments, the investigation query system 101 is configured to receive and process query search strings 121A, 121B and determine and report one or more historical query inputs 115, metadata 117, and/or the like that are within a threshold similarity of the query search string. In doing so, the investigation query system 101 may provide a search engine interface to assist investigators in identifying and accessing queries previously written for investigations, incidents, alerts, and/or the like. In this manner, investigative processes may be optimized and scaled without undesirable increases to the time and resources required to triage and investigate incidents. For example, scaling of incident response processes typically requires triaging of incidents based on an initial review by an investigator. Performance of such reviews may include establishing relevant information and data before moving on to containment or other stages of the incident review lifecycle. As scaling increases, manual approaches to accessing and integrating data may be increasingly inefficient and inadequate. As a result, such approaches may increase vulnerability of applications, networks, and users to anomalous activities. To overcome these challenges, the disclosed embodiments of the investigation query system 101 provide, maintain, and iteratively construct a central library of incident investigation-related queries and information. In this manner, as compared to manual approaches, the investigation query system 101 embodies a scaling knowledge base that better optimizes time and resource expenditures for investigating and triaging incidents.

In some embodiments, the investigation query system 101 is embodied as, or includes one or more of, an investigation query apparatus 300 (e.g., as further illustrated in FIG. 3 and described herein). Various applications and/or other functionality may be executed in the investigation query system 101 and/or investigation query apparatus 300 according to various embodiments. In some embodiments, the investigation query system 101 includes, but is not limited to, an accumulation service 107, a scheduling service 109, a task service 111, a plurality of processing units 113, one or more data stores 112, and/or the like. The elements of the investigation query system 101 can be provided via a plurality of computing devices that may be arranged, for example, in one or more server banks or computer banks or other arrangements. Such computing devices can be located in a single installation or may be distributed among many different geographical locations. For example, the investigation query system 101 can include a plurality of computing devices that together may include a hosted computing resource, a grid computing resource, and/or any other distributed computing arrangement. In some cases, the investigation query system 101 can correspond to an elastic computing resource where the allotted capacity of processing, network, storage, or other computing-related resources may vary over time.

As further illustrated in FIG. 2, the accumulation service 107 may communicate with computing devices 103 via a first API and with one or more applications via additional APIs specific to the corresponding application. For example, the accumulation service 107 may receive query search strings from and provision historical query inputs to a computing device 103 via a first API 150A. The accumulation service 107 may obtain investigation data from a first application 105A via a second API 150B and from a second application 105B via a third API 150C. The accumulation service 107 may store and retrieve data from one or more data stores 112. In various embodiments, the accumulation service 107 passes investigation data to and receive investigation datasets from one or more processing units 113. Alternatively, or additionally, in some embodiments, the processing units 113 may access and store data from and to the data store 112. In some embodiments, the accumulation service 107 is configured to initialize the scheduling service 109 and task service 111 to facilitate continued indexing and extraction of investigation data 114 and generating and/or updating of one or more incident investigation datasets.

In some embodiments, the accumulation service 107 is configured to index and extract subsets of investigation data 114 that match a definition. A respective subset of the investigation data 114 may be embody a collection of data associated with a historical incident investigation. For example, a respective subset of investigation data 114 may embody a ticket, alert, detection, and/or the like that was generated based on anomalous activity occurring on one or more applications 105, networks 140, computing devices, and/or the like. In some embodiments, one or more subsets of the investigation data 114 include a label. For example, a ticket may include a "cyber" label, and/or the like. In some embodiments, one or more subsets of the investigation data 114 include one or more fields including alert, event, task, sub-task, comment, and/or the like. In some embodiments, the definition identifies a particular formatting (including lack of formatting) of one or more subcomponents of a subset of investigation data 114. In some embodiments, the definition identifies one or more labels, fields, subcomponent formats, and/or the like such that the accumulation service 107 may index and extract subsets of the investigation data 114 (e.g., tickets) for which the identified labels, fields, subcomponent formats, and/or the like are present. For example, the definition may be "CYBER AND issuetype in (Alert, Event, Task, Sub-task) AND comment~"nofor-mat." Based on the definition, the accumulation service 107 may process a plurality of incident tickets to index and extract a subset of tickets that comprise a "CYBER" label, fields of alert, event, task, and sub-task, and unformatted comment subcomponents.

In some embodiments, the accumulation service 107 is configured to filter one or more subsets of investigation data 114 based at least in part on a regular expression (regex) definition. By doing so, the accumulation service 107 may harvest and store historical query inputs 115, metadata 117 and/or the like that were utilized in or obtained from a historical incident investigation. In this manner, the accumulation service 107 may extract and store tools and information with potential utility in performing future incident investigations. As one example, the accumulation service 107 may index and extract one or more subsets of investigation data 114 comprising historical query inputs 115 that satisfy the above definition. The accumulation service 107 may filter the historical query inputs 115 based at least in part on a regex definition of "[".*"", "index=.*", "source=.*", "(SELECT|UPDATE|DELETE|INSERT).+(FROM).+"]" to obtain a subset of definition-compliant historical query inputs 115. Additionally, or alternatively, the accumulation service 107 may store metadata associated with the respective historical incident investigations that correspond to the subset of definition-compliant historical query inputs 115. In various embodiments, the accumulation service 107 generates and stores one or more incident investigation datasets 119 comprising the extracted and filtered subsets of the investigation data 114 (e.g., definition-compliant historical query inputs 115, corresponding metadata 117, and/or the like).

In some embodiments, the accumulation service 107 comprises a web server, application, cloud service, and/or the like that enables a user of a computing device 103 to search incident investigation datasets 119 and identify one or more incident investigation datasets 119 (or subsets thereof) that are within a threshold similarity to a query search string 121A, 121B. For example, the accumulation service 107 may comprise a web server by which a computing device 103 may access a query interface configured to receive user inputs for defining query search strings 121A, 121B. In some embodiments, the accumulation service 107 is configured to compare a query search string 121B to one or more investigation datasets 119 to determine whether one or more subsets of a respective investigation dataset 119 are within a threshold similarity to the query search string 121B.

As one example, the accumulation service 107 may receive a query search string 121A, 121B from a computing device 103 via a network 140 and an API 150. The query search string 121A, 121B may be "osquery," and the accumulation service 107 may compare the query search string 121B to an investigation dataset 119 to generate a request response 123 comprising historical query inputs 115 that are within a threshold similarity to the query search string 121B. A second, more granular query search string 121A, 121B may be "osquery process tree," and the accumulation may generate a second request response 123 comprising historical inputs that are within a threshold similarity to the query search string 121B. In such context, the query interface 500 shown in FIG. 5 and described herein comprises an example of the second request response. In some embodiments, the accumulation service 107 further identifies metadata 117 for the one or more historical incident investigations with which returned historical query inputs 115 are associated. The request response 123 generated by the accumulation service 107 may further include the metadata 117 or a digital reference (e.g., network address, selectable field, and/or the like) by which the metadata 117 may be accessed or viewed. In some embodiments, dependent upon the format of the query search string, accumulation service 107 may generate a request response 123 comprising metadata 117. For example, as shown in the query interface 700 of FIG. 7, a query search string 121A may embody a request for historical query inputs 115 associated with a particular incident, detection, alert, and/or the like. In such contexts, the accumulation service 107 may generate and cause the computing device 103 to request response 123 comprising a plurality of historical query inputs 115 that are associated with an inputted incident identifier, detection identifier, alert identifier, and/or the like. As another example, as shown in the query interface 800 of FIG. 8, a query search string 121A may embody a request for historical query inputs 115 comprising internet protocol (IP) addresses. In such contexts, the accumulation service 107 may generate and cause the computing device 103 to render a request response 123 comprising a plurality of historical query inputs 115 that invoke IP addresses. In some embodiments, the request response 123 includes a digital reference to one or more historical query inputs 115 corresponding to the respective historical incident investigation with which the historical query inputs 115 are associated.

In some embodiments, the accumulation service 107 is configured to provision request responses 123 to a computing device 103 via one or more APIs 150. In doing so, the accumulation service 107 may cause the computing device 103 to render a GUI 132 on the display 130. For example, the accumulation service 107 may cause the computing device 103 to render a query interface comprising one or more returned historical query inputs 115 and one or more digital references to metadata 117 corresponding to the respective historical incident investigations with which the historical query inputs 115 are associated. In some embodiments, the accumulation service 107 further causes rendering of metadata 117 on the computing device 103 in response to the computing device 103 receiving a user input selecting a digital reference to the metadata 117.

In various embodiments, the accumulation service 107 processes an initial set of investigation data 114 to generate a plurality of investigation datasets 119. In some embodiments, the investigation query system 101 is configured to iteratively collect new investigation data 114 associated with ongoing and subsequent incident investigations. For example, the accumulation service 107 may initially index and extract a corpus of historical investigation data 114 from one or more data stores 112. Following initial deployment of the investigation query system 101, the scheduling service 109, task service 111, and one or more processing units 113 may, in coordination with the accumulation service 107, index, extract, and analyze subsequent investigation data 114 from newly initiated or ongoing incident investigations.

In some embodiments, the scheduling service 109 is configured to schedule tasks for performance by processing units 113. For example, the scheduling service 109 may generate and implement a task performance schedule to cause one or more processing units 113 to index and extract investigation data 114, historical query inputs 115, metadata 117, and/or the like at a predetermined frequency (e.g., every 30 seconds, 15 minutes, 1 hour, daily, or another suitable frequency). In doing so, the scheduling service 109 may enable the investigation query system 101 to iteratively update a knowledge base of tools (e.g., historical query inputs) and investigation information (e.g., metadata) that may be applied to ongoing or future incident investigations. In one example, the scheduling service 109 may embody a "beat" within the task queue implementation Celery.

In some embodiments, the task service 111 is configured to queue and command performance of tasks including indexing and extracting investigation data 114. In some embodiments, the task service 111 is configured to initiate performance of tasks by processing units 113. In some embodiments, the task service 111 is configured to queue and initiate performance of tasks based at least in part on a task performance schedule generated by the scheduling service 109. In one example, the task service 111 embodies a Redis server and queue. In various embodiments, the task service 111 enables asynchronous task performance by one or more processing units 113. In doing so, the functionality of the investigation query system 101 may be scaled and expanded through engagement of additional processing units 113. By this manner, the speed and throughput of the investigation query system 101 in indexing and extracting investigation data 114 may be calibrated to current and expected workloads. Further, tasks may be assigned a priority level and scheduled for specific instances, such as according to intervals of peak application or network activity.

In some embodiments, a respective processing unit 113 embodies a set of computing resources configured to perform a task asynchronously and independently from other processing units 113. In some embodiments, a processing unit 113 may obtain investigation data 114 from an application 105 via an API 150B. Alternatively, or additionally, in some embodiments, the accumulation service 107 may obtain investigation data 114 from an application 105 via an API 150B, and the scheduling service 109 and task service 111 may cause initialization of the processing unit 113 to index and extract historical query inputs 115, metadata 117, and/or the like from the investigation data 114. In one example, a processing unit 113 may embody a "worker" within the task queue implementation Celery.

In some embodiments, the investigation query system 101 includes one or more data stores 112. The various data in the data store 112 may be accessible to elements of the investigation query system 101, including the accumulation service 107, scheduling service 109, task service 111, processing units 113, or an apparatus 300 embodying the one or more system elements. The data store 112 may be representative of a plurality of data stores 112 as can be appreciated. The data stored in the data store 112, for example, is associated with the operation of the various applications, apparatuses, and/or functional entities described herein. The data stored in the data store 112 may include, for example, investigation data 114, historical query inputs 115, metadata 117, incident investigation datasets 119, query search strings 121, requests responses 123, log sources 125, utilization levels 127, and/or the like.

The data store 112 may include one or more storage units, such as multiple distributed storage units that are connected through a computer network. In some embodiments, the data store 112 is representative of a plurality of data stores including a first subset of data stores internal to the investigation query system 101 and a second subset of data stores associated with one or more applications 105, which may be accessible to the investigation query system 101 via one or more APIs 150'. Each storage unit in the data store 112 may store at least one of one or more data assets and/or one or more data about the computed properties of one or more data assets. Moreover, each storage unit in the data store 112 may include one or more non-volatile storage or memory media including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

In some embodiments, investigation data 114 includes any data associated with activities occurring on one or more applications 105 or networks 140, or incident investigations performed respective to said activities. Additionally, investigation data 114 may include data associated with computing devices in communication with one or more applications 105, networks 140, and/or the like. In some embodiments, investigation data 114 includes network device identifiers (e.g., IP address, media access control (MAC) address, and/or the like), user identifiers, user inputs, application or network responses, activity timestamps, application or system statuses, investigator comments, flags, alerts, detections, incident labels, incident summaries, and/or the like. In various embodiments, investigation data 114 includes query inputs, which may be initiated by incident investigators including human subjects, computing entities, and/or the like. In some embodiments, a log source 125 includes one or more sets of investigation data 114. The log source 125 may be associated with a particular application 105, network 140, computing device, or investigator.

In some embodiments, historical query inputs 115 include any prior inputted or executed keywork, script, code, or set of instructions for searching, indexing, or organizing a data structure. For example, a historical query input 115 may include an executable script for a searching within a database, such as a query in Splunk. In some embodiments, when executed, a historical query input 115 enables parsing and analysis of log sources 125 and other records of application, network, or user behavior. In some embodiments, a query input 115 is executable to extract particular information from a set of investigation data 114 including events, metrics, hosts, sources, source types, fields, tags, timestamps, indexes, and/or the like.

In some embodiments, metadata 117 includes any data associated with a historical query input 115, an author of a historical query input 115, or an incident investigation with which a historical query input 115 or historical incident is associated. In some embodiments, metadata 117 includes query creation timestamps, query descriptions, query author identifiers, incident identifiers (e.g., ticket numbers, alert types, detection types, flags, and/or the like), incident labels, and/or the likes. Additionally, or alternatively, in some embodiments, metadata 117 comprises subsets of investigation data 114. For example, metadata 117 may include network device identifiers, events, metrics, hosts, sources, source types, fields, tags, timestamps, indexes, summaries, and/or the like. In some embodiments, an incident summary includes any description of an incident, incident investigation, and/or the like, which may be generated by an investigator. For example, an incident summary may comprise one or more comments inserted or tagged to an entry within a log source 125.

In some embodiments, a respective incident investigation dataset 119 includes extracted historical query inputs 115 and respective metadata 117 associated with a historical query input 115 and/or historical incident investigation to which the historical query input 115 was applied. In some embodiments, an incident investigation dataset 119 comprises historical query inputs 115 and metadata 117 for a particular incident investigation, incident type, application 105, computing device, or other criteria. Alternatively, an incident investigation dataset 119 may include historical query inputs 115 and metadata 117 derived from multiple incident investigations.

In some embodiments, a query search string 121A, 121B includes any character input for searching the historical query inputs 115, metadata 117, incident investigation datasets 119, and/or the like of the investigation query system 101. For example, a query search string 121A, 121B may define a keyword, key phrase, metadata type, and/or the like for which an incident investigator desires to identify prior executed queries that invoked the same subject matter. A query search string 121A, 121B may include one or more search operators that define a matching pattern or rule, such as Boolean operators, regex operators, and/or the like. In some embodiments, Boolean operators include AND, OR, and NOT. In one example, regex operators include ^, $, ., |, ( . . . ), [ . . . ], [a-z], [0-9], {x}, {x,}, *, +, ?, or /. In some embodiments, the accumulation service 107 filters an incident investigation dataset 119, historical query inputs 115, and/or the like based at least in part on Boolean operators, regex operators, and/or the like. In some embodiments, the accumulation service 107 is configured to perform approximate string searching based on a query search string 121A, 121B to identify and report relevant historical query inputs, metadata, and/or the like. In some embodiments, approximate searching is a user configurable property of the investigation query system 101 such that an investigator may command the accumulation service 107 whether or not to perform approximate searching techniques.

In some embodiments, a request response 123 includes any historical query inputs 115, metadata 117, digital references to query inputs or metadata, and/or the like that are determined to be within a threshold similarity of a query search string (or which are associated with a returned historical query input 115 or metadata 117). For example, a query search string 121 may embody one or more keywords, and a request response 123 generated based on the keyword and an investigation dataset 119 may include a plurality of historical query inputs 115 that invoke the same or similar contents. In some embodiments, a digital reference includes a network address, application field, and/or the like by which metadata 117 may be accessed or viewed.

In some embodiments, a log source 125 includes investigation data 114, naming conventions, events, and/or the like that are associated with a particular application 105, network 140, computing device, user, organization, and/or the like. For example, a first log source 125 may be associated with a first application 105 and a second log source 125 may be associated with a second log source 125. The first and second log sources 125 may each comprise events, statuses, errors, and/or the like observed in the corresponding first or second application 105. In various embodiments, a log source embodies a repository of application-, user-, computing device-, and/or network-specific data that may be utilized by incident investigators to evaluate and triage anomalous activities.

In some embodiments, a utilization level 127 represents a frequency of use, volume of use, and/or the like of one or more log sources 125. For example, a utilization level 127 may comprise a metric indicative of the frequency with which a particular investigator, a team of investigators, or all investigators of one or more organizations accessed a one or more log sources 125. As another example, a utilization level 127 may alternatively or additionally comprise a metric indicative of an amount of data obtained from a log source by one or more investigators in performance of one or more incident investigations (e.g., for all time or within a predetermined interval, such as 1 day, 1 week, 1 quarter, or another suitable interval). In some embodiments, an investigation dataset 119 includes associations between investigation data, historical query inputs 115, metadata 117, and/or the like contained therein and one or more log sources 125 such that the accumulation service 107 may track utilization of log sources 125 by incident investigators. In various embodiments, the accumulation service 107 is configured to determine respective utilization levels 127 for log sources 125 and generate sets of high utilization, low utilization, unused log sources.

The network 140 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, the network 140 may include a cellular telephone, an 802.11, 802.16, 802.20, and/or WiMax network. Further, the network 140 may include a public network, such as the Internet, a private network, such as an intranet, or combinations thereof, and may utilize a variety of networking protocols now available or later developed including, but not limited to Transmission Control Protocol/Internet Protocol (TCP/IP) based networking protocols. For instance, the networking protocol may be customized to suit the needs of a group-based communication system. In some embodiments, the protocol is a custom protocol of JavaScript Object Notation (JSON) objects sent via a Websocket channel. In some embodiments, the protocol is JSON over RPC, JSON over REST/HTTP, and the like. In various embodiments, the APIs 150, 150' embody one or more interfaces and associated functions that enable communication between the investigation query system 101 and the computing devices 103 or applications 105. For example, the API 150 may enable communication between the investigation query system 101 and the computing devices 103, and a respective API 150' may enable communication between the investigation query system 150 and an application 105.

Exemplary Apparatus

The investigation query system 101 may be embodied by one or more computing systems, such as apparatus 300 shown in FIG. 3. The apparatus 300 may include processor 302, memory 304, input/output circuitry 306, communications circuitry 308, and query processing circuitry 309. The apparatus 300 may be configured to execute the operations described herein. Although these components 302-309 are described with respect to functional limitations, it should be understood that the particular implementations necessarily include the use of particular hardware. It should also be understood that certain of these components 302-309 may include similar or common hardware. For example, two sets of circuitries may both leverage use of the same processor, network interface, storage medium, or the like to perform their associated functions, such that duplicate hardware is not required for each set of circuitries. The various services and processing units of the investigation query system 101 may be embodied individually or collectively by one or more of the circuitries 302-309. For example, the described functionality of the accumulation service 107, scheduling service 109, task service 111, processing units 113, and/or the like may be performed by one or more of the processor 302, input/output circuitry 306, communications circuitry 308, or query processing service 309.

In some embodiments, the processor 302 (and/or co-processor or any other processing circuitry assisting or otherwise associated with the processor) may be in communication with the memory 304 via a bus for passing information among components of the apparatus. The memory 304 is non-transitory and may include, for example, one or more volatile and/or non-volatile memories. In other words, for example, the memory 304 may be an electronic storage device (e.g., a computer-readable storage medium). The memory 304 may be configured to store information, data, content, applications, instructions, or the like for enabling the apparatus to carry out various functions in accordance with example embodiments of the present disclosure. For example, the memory 304 may store contents of the data store 112 shown in FIG. 1 and described herein.

The processor 302 may be embodied in a number of different ways and may, for example, include one or more processing devices configured to perform independently. In some preferred and non-limiting embodiments, the processor 302 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 302 may be configured to execute instructions stored in the memory 304 or otherwise accessible to the processor 302. In some preferred and non-limiting embodiments, the processor 302 may be configured to execute hard-coded functionalities. As such, whether configured by hardware or software methods, or by a combination thereof, the processor 302 may represent an entity (e.g., physically embodied in circuitry) capable of performing operations according to an embodiment of the present disclosure while configured accordingly. Alternatively, as another example, when the processor 302 is embodied as an executor of software instructions, the instructions may specifically configure the processor 302 to perform the algorithms and/or operations described herein when the instructions are executed.

In some embodiments, the apparatus 300 may include input/output circuitry 306 that may, in turn, be in communication with processor 302 to provide output to the user and, in some embodiments, to receive an indication of a user input. The input/output circuitry 306 may include a user interface and may include a display, and may include a web user interface, a mobile application, a query-initiating computing device, a kiosk, or the like. In some embodiments, the input/output circuitry 306 may also include a keyboard, a mouse, a joystick, a touch screen, touch areas, soft keys, a microphone, a speaker, or other input/output mechanisms. The processor and/or user interface circuitry including the processor may be configured to control one or more functions of one or more user interface elements through computer program instructions (e.g., software and/or firmware) stored on a memory accessible to the processor (e.g., memory 304, and/or the like).

The communications circuitry 308 may be any means such as a device or circuitry embodied in either hardware or a combination of hardware and software that is configured to receive and/or transmit data from/to a network and/or any other device, circuitry, or module in communication with the apparatus 300. In this regard, the communications circuitry 308 may include, for example, a network interface for enabling communications with a wired or wireless communication network. For example, the communications circuitry 308 may include one or more network interface cards, antennae, buses, switches, routers, modems, and supporting hardware and/or software, or any other device suitable for enabling communications via a network. Additionally, or alternatively, the communications circuitry 308 may include the circuitry for interacting with the antenna/antennae to cause transmission of signals via the antenna/antennae or to handle receipt of signals received via the antenna/antennae. In some embodiments, the communications circuitry 308 performs functionality of the accumulation service 107, one or more processing units 113, and/or the like. For example, the communications circuitry 308 may comprise or utilize one or more APIs to obtain investigation data, access log sources, receive requests from computing devices, and provision requests responses to computing devices. In some embodiments the communications circuitry 308 may include circuitry for generating a request response based at least in part on outputs of the accumulation service 107 including historical query inputs, metadata (or digital references to metadata), utilization levels, sets of high utilization, low utilization, or unused log sources, and/or the like.

The query processing circuitry 309 may be any means such as a device or circuitry embodied in either hardware or a combination of hardware and software that is configured to index and extract investigation data 114 and process query search strings to identify and report relevant historical query inputs and metadata for reuse in current or subsequent incident investigations. The query processing circuitry 309 may embody one or more functionalities of the accumulation service 107, scheduling service 109, task service 111, processing units 113, and/or the like as shown FIG. 1 and described herein. For example, the query processing circuitry 309 may generate an incident investigation dataset based at least in part on historical query inputs and respective metadata associated with a plurality of historical incident investigations. As another example, responsive to receiving a query search string, the query processing circuitry 309 may determine one or more historical query inputs and/or metadata that are within a threshold similarity to the query search string.

It is also noted that all or some of the information discussed herein can be based on data that is received, generated and/or maintained by one or more components of apparatus 300. In some embodiments, one or more external systems (such as a remote cloud computing and/or data storage system) may also be leveraged to provide at least some of the functionality discussed herein.

Example Data Flows and Operations

To address some of the shortcomings of various existing approaches to identifying and accessing useful tools for investigating cyber incidents, various embodiments of the present disclosure provide techniques for accumulating and reporting on prior investigation techniques. For example, in some embodiments, an investigation query system scrapes and organizes investigation data into one or more investigation datasets comprising query inputs, metadata, and/or the like that were utilized in prior incident investigations. Further, the investigation query system may receive a query string input associated with a current incident investigation and determine a subset of the investigation dataset that demonstrates similarity and, therefore, potential utility and applicability to carrying out the current incident investigation.

By utilizing the noted techniques for accumulating and reporting relevant historical query inputs, various embodiments of the present disclosure enhance the quality and speed of conducting incident investigations. In doing so, the noted embodiments of the present disclosure can improve resource utilization efficiency and increase the scalability of conducting incident investigations and triage. Accordingly, various embodiments of the present disclosure improve computational resource efficiency and application security.

FIG. 4 is a flowchart diagram of an example process 400 for querying incident investigations in accordance with at least some embodiments of the present disclosure. The process 400 may be performed by various embodiments of the investigation query system 101 shown in FIG. 1 and described herein. For example, the process 400 may be performed by an apparatus 300 that embodies functionality of the investigation query system 101 described herein. In some embodiments, via various operations of the process 400, the investigation query system 101 may improve incident investigation efficiency and quality by enabling investigators to more rapidly and automatically identify previously used techniques and information that may be reapplied and iterated upon in current incident investigations.

At operation 403, the process 400 includes obtaining a plurality of historical query inputs. For example, the apparatus performing the process 400 includes means, such as the processor 302, the memory 304, the input/output circuitry 306, the communication circuitry 308, the query processing circuitry 309, or the like, for obtaining a plurality of historical query inputs 115. In some embodiments, the apparatus indexes and extracts investigation data comprising historical query inputs from one or more applications 105, log sources, and/or the like, which may be facilitated via one or more APIs. In one example, the apparatus obtains historical query inputs and metadata associated with historical incident investigations from one or more log sources. In another example, the apparatus obtains an investigation summary from a remote computing environment associated with an application 105, log source, and/or the like. The apparatus may extract from the investigation summary one or more historical query inputs 115, metadata 117, and/or the like. In some embodiments, the apparatus obtains one or more historical query inputs 115 and/or metadata 117 as an output of tasks initiated by an asynchronous task service and performed by one or more processing units. For example, the task service 111 may cause one or more processing units 113 to check for updates to a log source or other repository of investigation data 114. The processing units 113 may obtain additional investigation data 114 (e.g., comprising historical query inputs 115, metadata 117, and/or the like) from the updated log source, or otherwise from one or more applications 105, via one or more APIs.

In some embodiments, at operation 403 the process 400 optionally includes obtaining investigation data representative of one or more current incident investigations. For example, the apparatus performing the process 400 includes means, such as the processor 302, the memory 304, the input/output circuitry 306, the communication circuitry 308, the query processing circuitry 309, or the like, for obtaining investigation data 114 representative of one or more current incident investigations. In doing so, the apparatus may compare investigation data for the current incident investigation to investigation data for one or more historical incident investigations and, via subsequent operations described herein, determine and report one or more historical query inputs that may be reapplied to the current incident investigation. For example, at operation 421, investigation data associated with a current investigation may be included in or substituted for a query search string such that the apparatus determines one or more historical incident investigations within a threshold similarity of the current incident investigation and returns respective historical query inputs utilized in the historical incident investigations.

At operation 406, the process 400 optionally includes filtering the plurality of historical query inputs based at least in part on a regular expression (regex) definition. For example, the apparatus performing the process 400 optionally includes means, such as the processor 302, the memory 304, the input/output circuitry 306, the communication circuitry 308, the query processing circuitry 309, or the like, for filtering the plurality of historical query inputs 115, or respective investigation data 114 comprising the historical query inputs 115, based at least in part on a regex definition. For example, at operation 403, the apparatus may determine that updates have been added to one or more log sources associated with an active investigation of an incident, and, in response, the apparatus may extract the updated investigation data via one or more APIs. Alternatively, or additionally, the apparatus 400 may obtain one or more sets of investigation data associated with one or more historical incident investigations, such as a closed or resolved investigation. The apparatus may fetch the updated investigation data from the corresponding log sources, applications, and/or the like via one or more APIs. The apparatus may apply a regex definition-based filter to the updated investigation data to verify that the investigation data contains a query input, which may be embodied as a code block macro containing the "{noformat<content>{noformat}" substring. The apparatus may further verify that the {noformat} component comprises a substring that matches a naming convention of the log source with which the extracted investigation data is associated.

At operation 409, the process 400 includes generating one or more incident investigation datasets. For example, the apparatus performing the process 400 includes means, such as the processor 302, the memory 304, the input/output circuitry 306, the communication circuitry 308, the query processing circuitry 309, or the like, for generating one or more incident investigation datasets 119. In some embodiments, the investigation dataset 119 comprises a plurality of historical query inputs 115 with subset of the historical query inputs 115 being associated with respective historical incident investigations. Additionally, in some embodiments, the investigation dataset 119 comprises respective metadata 117 associated with the historical incident investigations. The metadata 117 may include, for example, incident identifiers, incident summaries (or digital references to incident summaries), creation timestamps for the historical incident investigation or historical query input, or respective user identifiers associated with one or more investigators that conducted the historical incident investigation.

At operation 412, the process 400 includes receiving a query search string. For example, the apparatus performing the process 400 includes means, such as the processor 302, the memory 304, the input/output circuitry 306, the communication circuitry 308, the query processing circuitry 309, or the like, for receiving a request comprising a query search string 121A, 121B. In some embodiments, the request is received from a computing device 103 via an API 150. In some embodiments, the query search string 121A, 121B comprises one or more Boolean operators. In some embodiments, the query search string comprises 121A, 121B comprises one or more regex operators.

The apparatus may interpret the query search string according to one or more settings or parameters, such as a configurable setting for enabling use of regex operators. For example, in response to a user input at the computing device 103, the apparatus may adjust one or more parameters of query search string processing such that the apparatus interprets the query search string 121A, 121B according to one or more regex operators present therein. As another example, the apparatus may be configured to switch between a precise search mode that is fault intolerant (e.g., at least a subset of each returned historical query input contains an exact match to one or more portions of the query search string) and an approximate mode (e.g., fuzzy search) that is fault tolerant to typos, spaces, and intervening characters when determining one or more historical query inputs to return based on the query search string.

At operation 415, the process 400 optionally includes performing an approximate search of one or more incident investigation datasets based on the query search string. For example, the apparatus performing the process 400 optionally includes means, such as the processor 302, the memory 304, the input/output circuitry 306, the communication circuitry 308, the query processing circuitry 309, or the like, for performing an approximate search of an incident investigation dataset 119 based on a query search string 121A, 121B. In some embodiments, the apparatus generates one or more similarity metrics between the query search string 121A, 121B between respective historical query inputs 115, metadata 117, and/or the like of the incident investigation dataset 119. In some embodiments, a respective similarity metric includes cosine similarity, hamming distance, Levenshtein distance, Jaro-Winkler similarity, and/or the like.

At operation 418, the process 400 optionally includes filtering one or more incident investigation datasets based at least in part on the query search string. For example, the apparatus performing the process 400 optionally includes means, such as the processor 302, the memory 304, the input/output circuitry 306, the communication circuitry 308, the query processing circuitry 309, or the like, for filtering one or more incident investigation datasets based at least in part on a query search string 121A, 121B. In some embodiments, the filtering operation may return one or more historical query inputs 115, subsets of metadata 117, and/or the like that are within a threshold similarity to the query search string. In various embodiments, the threshold similarity may be configured based at least in part on a configured search mode. For example, in a precise search mode, the apparatus may return only a subset of historical query inputs 115 for which at least a portion thereof exactly matches at least a segment of a query search string. As another example, in an approximate search mode, the apparatus may return historical query inputs 115 that approximately match one or more segments of a query search string.

In some embodiments, the apparatus filters the incident investigation dataset 119 based on one or more regex operators, Boolean operators, and/or the like. Additionally, or alternatively, in some embodiments, the query search string 121A, 121B includes one or more metadata types (e.g., incident identifier, detection code, alert designation, and/or the like), and the apparatus filters the incident investigation dataset 119 to obtain a subset of metadata 117 associated with the metadata type. In some embodiments, the query search string 121A, 121B includes an incident identifier associated with a historical incident investigation, incident investigator, and/or the like. In such contexts, the apparatus may filter the incident investigation dataset 119 to determine a subset of historical query inputs 115, metadata 117, and/or the like that is associated with the historical incident investigation, incident investigator, and/or the like. In various embodiments, at operation 415 and/or operation 418, the apparatus determines one or more historical query inputs 115, subsets of metadata 117, and/or the like that are within a threshold similarity of the query search string 121A, 121B.

At operation 421, the process 400 includes generating a request response based at least in part on the query search string and one or more incident investigation datasets. For example, the apparatus performing the process 400 includes means, such as the processor 302, the memory 304, the input/output circuitry 306, the communication circuitry 308, the query processing circuitry 309, or the like, for generating a request response 123 based at least in part on one or more incident investigation datasets 119. In some embodiments, the response includes one or more historical query inputs 115, metadata 117, and/or the like that are within a threshold similarity of the query search string 121A, 121B and/or associated with a historical incident investigation corresponding to a returned historical query input. For example, a response may include a historical query input 115 associated with a historical incident investigation. The apparatus may determine metadata 117 associated with the historical incident investigation. The response may further include the determined metadata 117 or a digital reference by which the metadata 117 may be accessed or viewed. In some embodiments, the metadata 117 includes an incident identifier (e.g., ticket number, detection code, alert designation, and/or the like). In some embodiments, the metadata 117 includes an incident summary. In some embodiments, a timestamp associated with initiation of the respective historical incident investigation. In some embodiments, the metadata 117 includes a user identifier associated with an author or other previous user of the historical query input 115.

At operation 424, the process 400 provisioning the request response to the computing device. For example, the apparatus performing the process 400 includes means, such as the processor 302, the memory 304, the input/output circuitry 306, the communication circuitry 308, the query processing circuitry 309, or the like, for provisioning the request response 123 to the computing device 103 from which the query search string 121A, 121B was received. In various embodiments, the apparatus provisions the request response 123 to the computing device 103 via an API 150. In some embodiments, the provision of the request response 123 to the computing device 103 causes the computing device 103 to render a GUI 132 on a display 130 of the computing device 103 or update an existing rendering of a GUI 132. For example, the apparatus may cause the computing device 103 to render a query interface 500, 600A, 600B, 700, or 800 as shown in FIGS. 5, 6A, 6B, 7, and 8, respectively, and described herein.

In some embodiments, the rendering of the GUI 132 comprises the one or more returned historical query inputs 115 and digital references to the respective metadata 117 for the historical incident investigations with which the historical query inputs 115 are associated. In some embodiments, the GUI 132 comprises metadata 117. For example, in instances where the query search string 121A, 121B embodies one or more regex operators that define a metadata type (e.g., internet protocol (IP) address, location, user identifier, timestamp, and/or the like), the request response 123 rendered on the GUI 132 may comprise metadata 117 of the requested metadata type.

Additionally, or alternatively, in some embodiments, the process 400 includes provisioning to the computing device 103 one or more files or other virtual storage media comprising historical query inputs 115, metadata 117, and/or the like which was determined to be within a threshold similarity of the query search string. For example, the apparatus may provision a file comprising a plurality of historical query inputs 115 to the computing device 103. Alternatively, the apparatus may provision to the computing device 103 a digital reference to the file to enable the computing device 103 to access, view, or download the file from a remote computing environment.

At operation 427, the process 400 optionally includes causing the rendering of metadata on the displayed GUI in response to user input selecting a digital reference. For example, the apparatus performing the process 400 optionally includes means, such as the processor 302, the memory 304, the input/output circuitry 306, the communication circuitry 308, the query processing circuitry 309, or the like, for causing rendering of metadata 117 on the GUI 132 in response to the computing device 103 receiving a user input selecting a rendered digital reference. The computing device 103 may receive a user input selecting a rendered field associated with a digital reference to metadata 117. In response to the user input, the apparatus may receive a request from the computing device 103 via the API 150. The request may include an identifier associated with the metadata 117 or historical incident investigation with which the selected metadata is associated. In response to the request, the apparatus may cause rendering of the associated metadata 117 on the GUI.

At operation 430, the process 400 optionally includes determining respective utilization levels of one or more log sources for one or more applications. For example, the apparatus performing the process 400 optionally includes means, such as the processor 302, the memory 304, the input/output circuitry 306, the communication circuitry 308, the query processing circuitry 309, or the like, for determining respective utilization levels 127 for one or more log sources 125. In various embodiments, the utilization level 127 indicates a frequency or volume of usage or access of the corresponding log source 125 in investigating incidents. For example, the apparatus may At operation 433, the process 400 optionally includes generating a set of unused log sources, a set of high utilization log sources, and/or the like based at least in part on the respective utilization levels. For example, the apparatus performing the process 400 optionally includes means, such as the processor 302, the memory 304, the input/output circuitry 306, the communication circuitry 308, the query processing circuitry 309, or the like, for generating a set of unused log sources 125, a set of high utilization log sources 125, and/or the like based at least in part on the respective utilization levels 127. By doing so, the apparatus may determine resources having potentially the least and/or most utility in investigating anomalous activities in one or more applications, computing devices, networks, and/or the like.

At operation 436, the process 400 optionally includes provisioning one or more sets of log sources to one or more computing devices. For example, the apparatus performing the process 400 includes means, such as the processor 302, the memory 304, the input/output circuitry 306, the communication circuitry 308, the query processing circuitry 309, or the like, for provisioning a set of high use log sources 125, a set of unused log sources 125, and/or the like to one or more computing devices 103. In this manner, the apparatus may alert incident investigators and other stakeholders as to resources with the greatest potential impact to advancing or resolving an investigation, thereby improving investigation efficiency and accuracy.

FIG. 5 shows a computing device 103 including a rendering of an example query interface 500. For example, the query interface 500 may embody a GUI 132 rendered on the display 130 of the computing device 103. In some embodiments, the query interface 500 includes a search field 501 configured to receive a query search string 121. The query search string 121 may include alphanumeric characters, regex operators, Boolean operators, and/or the like. In some embodiments, in response to receiving a user input to the search field 501, the computing device 103 provisions a query search string 121 to the disclosed investigation query system via an API. In some embodiments, the query interface 500 includes a request response 123, which may be generated based at least in part on a query search string 121. In some embodiments, the request response 123 includes one or more historical query inputs. For example, the request response 123 may include a first historical query input 115A and a second historical query input 115B. In some embodiments, the request response 123 includes respective metadata associated with the historical query inputs 115A, 115B. For example, the request response 123 may include metadata 117A comprising a timestamp associated with creation or execution of a historical query input. As another example, the request response may include metadata 117B comprising a description of the associated historical query input, incident investigation, and/or the like.

In some embodiments, the request response 123 includes one or more digital references to metadata with which a historical query input, historical incident investigation, and/or the like is associated. For example, the request response 123 may include a first digital reference 503A for metadata associated with the first historical query input 115A and a second digital reference 503B for metadata associated with the second historical query input 115B. In some embodiments, a digital reference comprises a network address and/or the like by which metadata may be viewed or accessed. For example, the digital references 503A, 503B may comprise hyperlinks that may be selected to access or view corresponding metadata.

FIG. 6A shows a computing device 103 including a rendering of an example query interface 600A. For example, the query interface 600A may embody a GUI 132 rendered on the display 130 of the computing device 103. In some embodiments, a query interface includes one or more fields by which one or more parameters of historical query input searching may be configured. For example, the query interface 600A may include a selectable field 601 by which regex-based searching may be enabled or disabled. In some embodiments, in response to the computing device 103 receiving a user input selecting the field 601, the disclosed investigation query system is configured to recognize regex operators within inputted query search strings. Alternatively, in response to user input at the computing device 103, the investigation query system may be configured to ignore regex operators. While not shown in FIG. 6A, a query interface may comprise one or more selectable fields for enabling and disabling, at the investigation query system, a precise search mode, an approximate search mode, and/or the like. FIG. 6B shows a computing device 103 including a rendering of an example query interface 600B. The query interfaces 600A, 600B show example request responses 123A, 123B that may be generated in instances where regex operators are recognized (FIG. 6B) and ignored (FIG. 6A).

As another example, the query interface 600A may include a selectable field 603 by which an investigator may store and recall a historical query input. In some embodiments, in response to the computing device 103 receiving a selection of the field 603, the investigation query system determines and reports one or more historical query inputs stored in association with a computing device identifier, investigator identifier, and/or the like. For example, in response to selection of the field 603, the investigation query system may receive from the computing device 103 a request for one or more "starred" historical query inputs associated with the computing device 103 or a user thereof (e.g., an investigator). In response, the investigation query system may identify and provision to the computing device 103 one or more historical query inputs associated with the computing device 103, user, and/or the like.

FIG. 7 shows a computing device 103 including a rendering of an example query interface 700. For example, the query interface 700 may embody a GUI 132 rendered on the display 130 of the computing device 103. In some embodiments, a query search string 121 comprises or refers to metadata. For example, the query search string 121 shown in the query interface 700 may comprise a plurality of characters and one or more regex operators that embody a reference to IP addresses. In some embodiments, based on the query search string 121, the disclosed investigation query system determines one or more historical incident investigations, historical incident queries, and/or the like that comprise one or more IP addresses. In some embodiments, a request response comprises a plurality of historical input queries that include or refer to the metadata referenced by the query search string 121.

As another example, a query search string 121 inputted to the query interface 800 of FIG. 8 may comprise an identifier for a type of incident, detection, alert, and/or the like. In some embodiments, based on the query search string 121, the investigation query system determines one or more historical incident investigations, historical query inputs, and/or the like that are associated with the identifier. The investigation query system may provision to the computing device 103 a request response comprising historical query inputs, digital references to metadata, and/or the like that are associated with the incident type.

Additional Implementation Details

Although example processing systems have been described in the figures herein, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer-readable storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer-readable storage medium can be, or be included in, a computer-readable storage device, a computer-readable storage substrate, a random or serial access memory array or device, or a combination of one or more of them. Moreover, while a computer-readable storage medium is not a propagated signal, a computer-readable storage medium can be a source or destination of computer program instructions encoded in an artificially-generated propagated signal. The computer-readable storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (Application Specific Integrated Circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory, a random access memory, or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's query-initiating computing device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a query-initiating computing device having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., a Hypertext Markup Language (HTML) page) to a query-initiating computing device (e.g., for purposes of displaying information/data to and receiving user input from a user interacting with the query-initiating computing device). Information/data generated at the query-initiating computing device (e.g., a result of the user interaction) can be received from the query-initiating computing device at the server.

While this specification contains many specific implementation details, these should not be construed as limitations on the scope of any inventions or of what may be claimed, but rather as description of features specific to particular embodiments of particular inventions. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in incremental order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or incremental order, to achieve desirable results, unless described otherwise. In certain implementations, multitasking and parallel processing may be advantageous.

CONCLUSION

Many modifications and other embodiments of the inventions set forth herein will come to mind to one skilled in the art to which these inventions pertain having the benefit of the teachings presented in the foregoing description and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

That which is claimed is:

1. A method for incident investigation querying, comprising:

obtaining a plurality of historical query inputs, wherein subsets of the historical query inputs are associated with respective historical incident investigations;

generating an incident investigation dataset based at least in part on the historical query inputs and respective metadata associated with the historical incident investigations;

receiving, from a computing device via an application programming interface (API), a query search string;

generating a request response based at least in part on the query search string and the incident investigation dataset, wherein the request response comprises:

at least one historical query input; and a digital reference to the metadata for a respective historical incident investigation associated with the at least one historical query input, wherein at least one of the metadata or the at least one historical query input are within a threshold similarity to the query search string; and provisioning the request response to the computing device via the API, wherein the request response causes the computing device to render a graphical user interface (GUI) comprising the at least one historical query input and the digital reference to the metadata.

2. The method of claim 1, wherein:
the metadata comprises an incident identifier.

3. The method of claim 1, wherein:
the metadata comprises an incident summary.

4. The method of claim 1, wherein:
the metadata comprises a timestamp associated with initiation of the respective historical incident investigation.

5. The method of claim 1, wherein:
the metadata comprises at least one user identifier associated with the at least one historical query input.

6. The method of claim 1, further comprising:
filtering the plurality of historical query inputs based at least in part on a regular expression (regex) definition.

7. The method of claim 1, further comprising:
receiving, via a second API, at least one incident investigation summary; and
extracting at least a subset of the plurality of historical query inputs from the at least one incident investigation summary, wherein the at least one incident investigation summary is obtained from a remote computing environment via a second API.

8. The method of claim 7, wherein:
extracting a respective historical query input from the at least one incident investigation summary comprises:
verifying that the historical query input contains at least one unformatted substring component; and
verifying that at least a portion of the at least one unformatted substring component matches a naming convention of a log source associated with the at least one incident investigation summary.

9. The method of claim 1, further comprising:
obtaining at least one additional query input via an asynchronous task service; and
updating the incident investigation dataset based at least in part on the at least one additional query input.

10. The method of claim 1, further comprising:
generating a respective utilization level for a plurality of log sources based at least in part on the incident investigation dataset;
generating, based on the respective utilization levels, at least one of i) a set of unused log sources, or ii) a set of high utilization log sources; and
provisioning to a second computing device at least one of the set of unused log sources or the set of high utilization log sources.

11. The method of claim 1, further comprising:
in response to the computing device receiving an input selecting a respective digital reference, causing rendering of the metadata associated with one of the plurality of historical incident investigations on the GUI.

12. The method of claim 1, wherein:
the query search string comprises at least one regex operator; and
generating the request response comprises filtering respective entries of the incident investigation dataset based at least in part on the at least one regex operator.

13. The method of claim 1, wherein:
the query search string comprises at least one metadata type.

14. The method of claim 1, wherein:
the query search string comprises at least one at least one incident identifier associated with a respective historical incident investigation.

15. An apparatus for incident investigation querying, the apparatus comprising at least one processor and at least one non-transitory memory comprising program code, wherein the at least one non-transitory memory and the program code are configured to, with the at least one processor, cause the apparatus to:
obtain a plurality of historical query inputs, wherein subsets of the historical query inputs are associated with respective historical incident investigations;
generate an incident investigation dataset based at least in part on the historical query inputs and respective metadata associated with the historical incident investigations;
receive from a computing device via an application programming interface (API), a query search string;
generate a request response based at least in part on the query search string and the incident investigation dataset, wherein the request response comprises:
at least one historical query input; and
a digital reference to the metadata for a respective historical incident investigation associated with the at least one historical query input, wherein at least one of the metadata or the at least one historical query input are within a threshold similarity to the query search string; and
provision the request response to the computing device via the API, wherein the request response causes the computing device to render a graphical user interface (GUI) comprising the at least one historical query input and the digital reference to the metadata.

16. The apparatus of claim 15, wherein:
the at least one non-transitory memory and the program code are further configured to, with the at least one processor, cause the apparatus to:
configure the threshold similarity based at least in part on a request from the computing device, wherein the request indicates a precise search mode or an approximate search mode.

17. The apparatus of claim 15, wherein:
the at least one non-transitory memory and the program code are further configured to, with the at least one processor, cause the apparatus to:
obtain investigation data representative of a current incident investigation; and
generate the request response based at least in part on respective comparisons between the investigation data and the incident investigation dataset.

18. The apparatus of claim 15, wherein:
the at least one non-transitory memory and the program code are further configured to, with the at least one processor, cause the apparatus to:
receive from the computing device via the API a command to generate the request response in a precise search mode; and
in response to the command, verify that at least a subset of the at least one historical query input exactly matches at least a portion of the query search string.

19. The apparatus of claim 15, wherein:
the digital reference comprises a hyperlink to a remote computing environment comprising the metadata for the respective historical incident investigation associated with the at least one historical query input.

20. A computer program product for incident investigation querying, the computer program product comprising at least one non-transitory computer-readable storage medium having computer-readable program code portions stored therein, the computer-readable program code portions configured to:

obtain a plurality of historical query inputs, wherein subsets of the historical query inputs are associated with respective historical incident investigations;

generate an incident investigation dataset based at least in part on the historical query inputs and respective metadata associated with the historical incident investigations;

receive from a computing device via an application programming interface (API), a query search string;

generate a request response based at least in part on the query search string and the incident investigation dataset, wherein the request response comprises:

at least one historical query input; and a digital reference to the metadata for a respective historical incident investigation associated with the at least one historical query input, wherein at least one of the metadata or the at least one historical query input are within a threshold similarity to the query search string; and provision the request response to the computing device via the API, wherein the request response causes the computing device to render a graphical user interface (GUI) comprising the at least one historical query input and the digital reference to the metadata.

* * * * *